United States Patent [19]

Hall

[11] Patent Number: 5,841,494
[45] Date of Patent: Nov. 24, 1998

[54] TRANSFLECTIVE LCD UTILIZING CHIRAL LIQUID CRYSTAL FILTER/MIRRORS

[76] Inventor: Dennis R. Hall, 7075 SW. Hoodview Pl., Beaverton, Oreg. 97008

[21] Appl. No.: 670,451

[22] Filed: Jun. 26, 1996

[51] Int. Cl.[6] .......... G02F 1/1347; G02F 1/1335
[52] U.S. Cl. .............. 349/98; 349/74; 349/115
[58] Field of Search .............. 349/98, 74, 162, 349/114, 115

[56] References Cited

U.S. PATENT DOCUMENTS

| 3,679,290 | 7/1972 | Adams et al. | 350/157 |
| 3,711,181 | 1/1973 | Adams, Jr. et al. | 350/157 |
| 4,032,218 | 6/1977 | Scheffer | 349/115 |
| 5,150,236 | 9/1992 | Patel | 349/114 |
| 5,325,218 | 6/1994 | Willett et al. | 349/115 |

FOREIGN PATENT DOCUMENTS

| 4-134323 | 5/1992 | Japan | 349/115 |

OTHER PUBLICATIONS

Schadt & Fünfschilling, 1990 Jpn. J. Appl. Phys., vol. 29, No. 10, pp. 1974–1984, "New Liquid Crystals Polarized Color Projection Principle".

Schedt & Fünfschilling, 1990, SID 90 Digest, pp. 324–326 "Novel Polarized Liquid–Crystal Color Projection & New TN–LCD Operating Modes".

Maurer, SID 90 Digest, 1990, pp. 110–113, "Polarizing Color Filters Made From Cholesteric LC–Silicones".

LiLE & S.M. Faris, SID 96 Applications, 1996, pp. 111–113, "Single–Layer Super Broadband Reflective Polerizer".

D. Coates, M. J. Goodlings S. Greenfield, J.M. Hammer, S.A. Marden & G. L. Parri, SID 96 Applications Digest, 1996, pp. 67–70,"High Performance Wide–Band Reflective Cholesteric Polarizers".

*Primary Examiner*—William L. Sikes
*Assistant Examiner*—Tiep H. Nguyen

[57] ABSTRACT

A transflective Liquid Crystal Display (LCD) system is described, wherein the half silvered mirror is replaced by Chiral Liquid Crystal (CLC) reflectors/filters, which increase the reflected and transmitted brightness from over two times to as much as ten times. These principles are also applied to create an improved efficiency full color transflective LCD and a number of high brightness, limited color, displays.

21 Claims, 16 Drawing Sheets

PRIOR ART

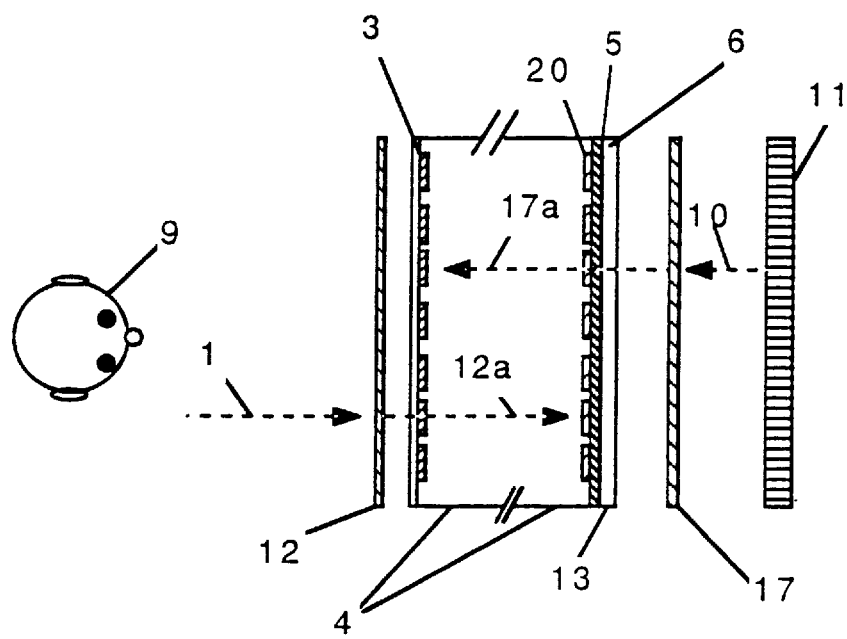
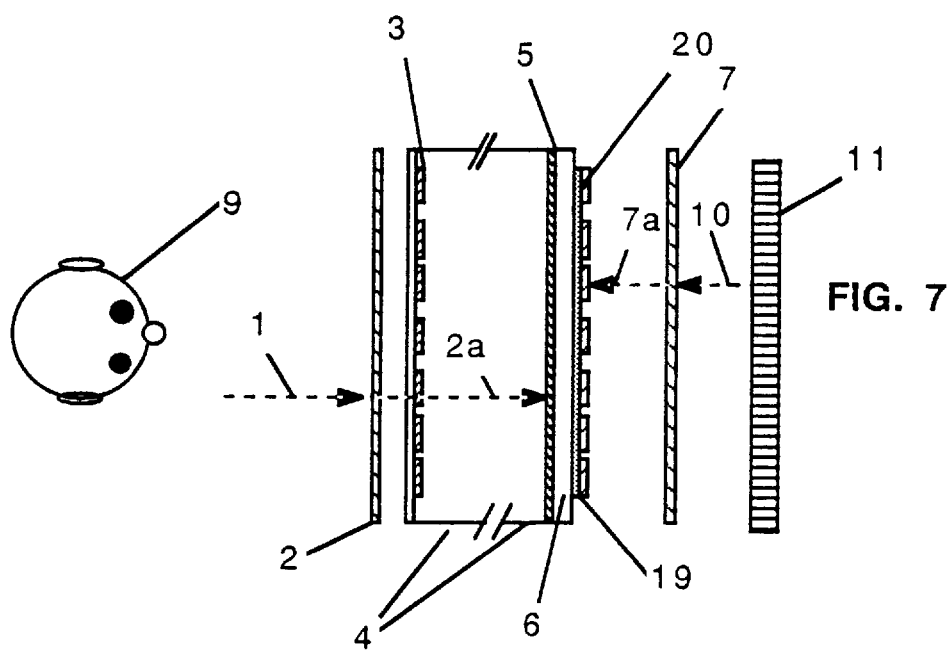

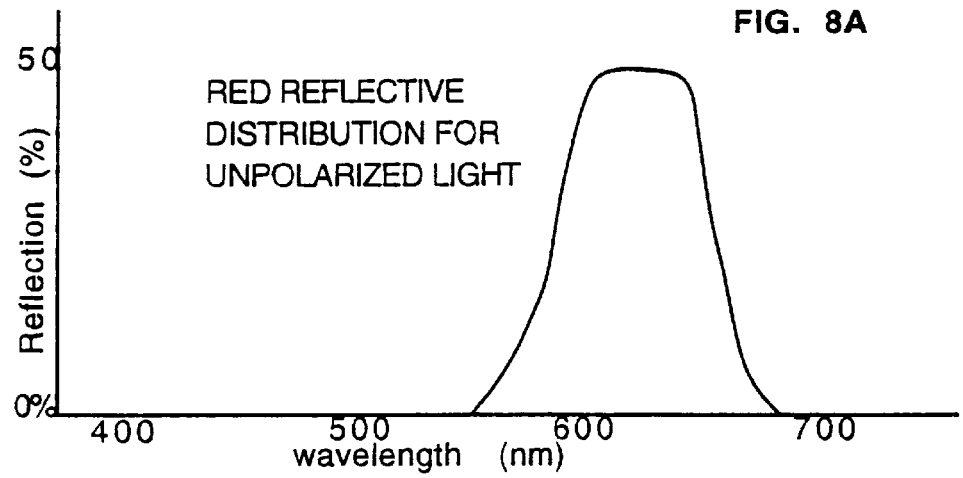
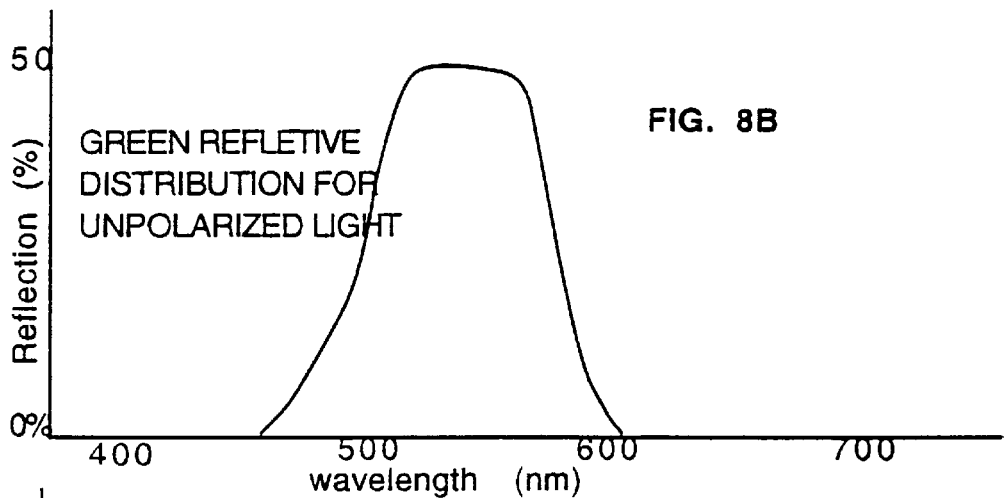
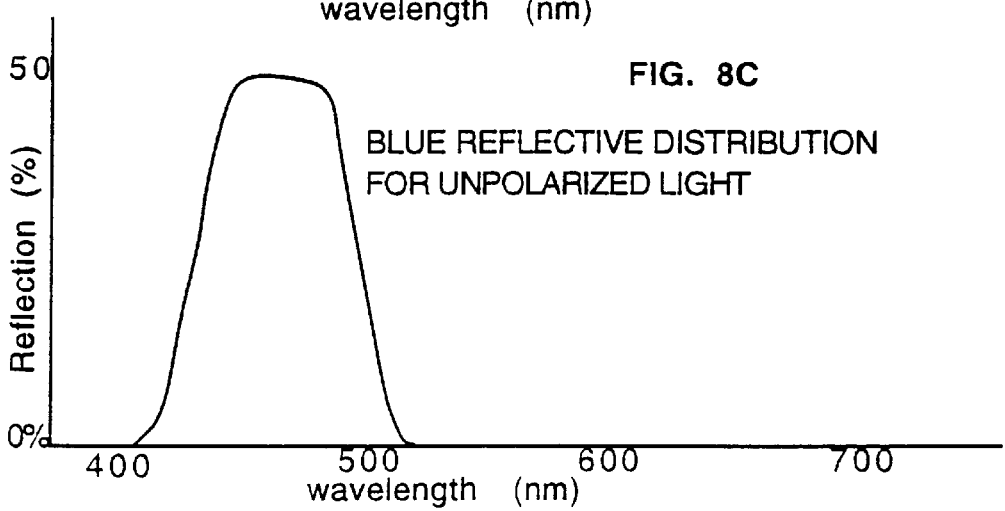

TRANSMISSION DISTRIBUTION CURVES FOR WHITE CPL OF THE SAME HANDEDNESS AS THAT OF THE CLC MATERIAL

RED REFLECTIVE CLC MATERIAL

GREEN REFLECTIVE CLC MATERIAL

BLUE REFLECTIVE CLC MATERIAL

SUMMATION OF LUMINANCE
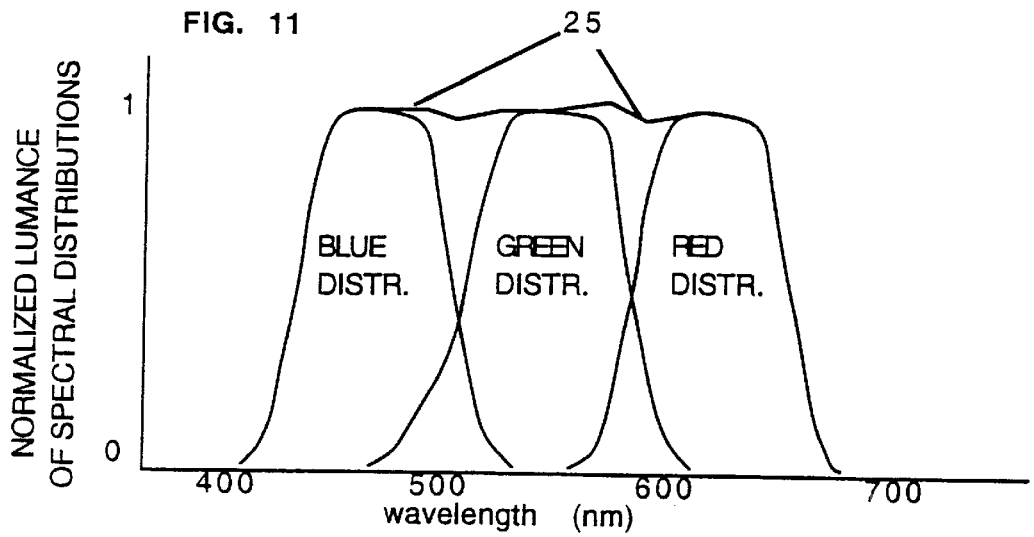
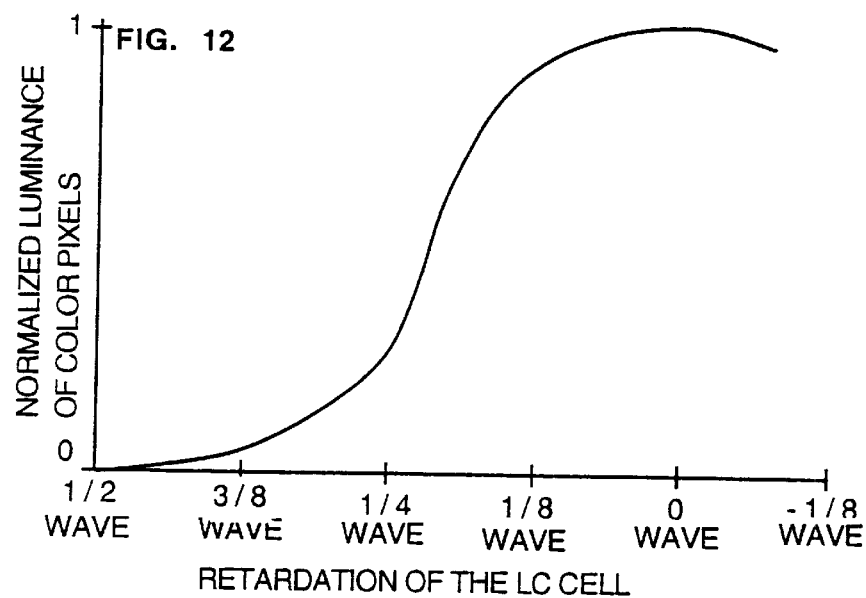
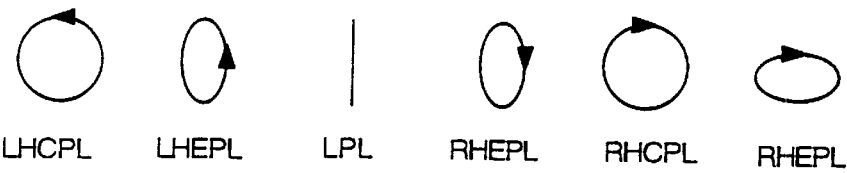
configuration of the light at the CLC color element for RHCPL input

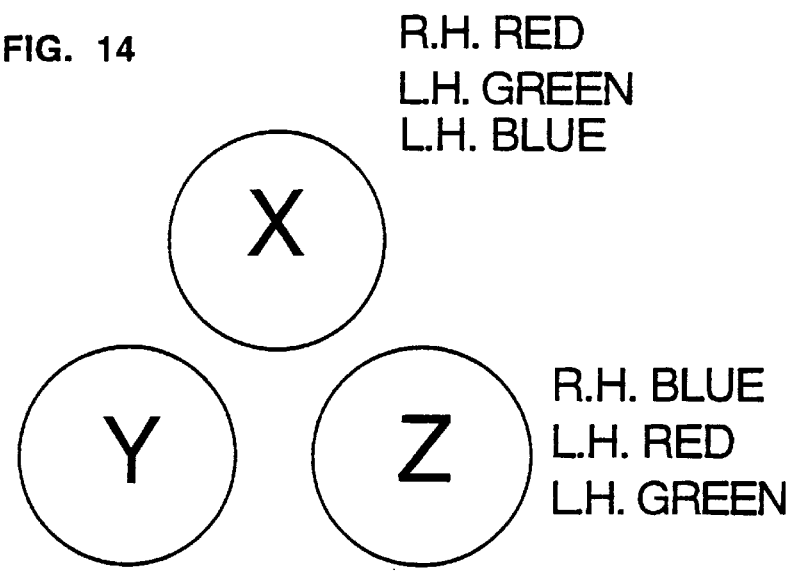
FIG. 14 TRIAD DETAIL
three layers of CLC in each sub-pixel (X, Y and Z)

DISTRIBUTION OF GREEN AND BLUE, PLUS GREEN, PLUS GREEN AND RED ENVELOPE (G&B + G + G&R)

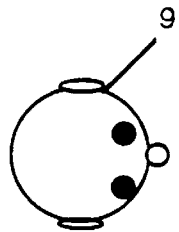
FIG. 18
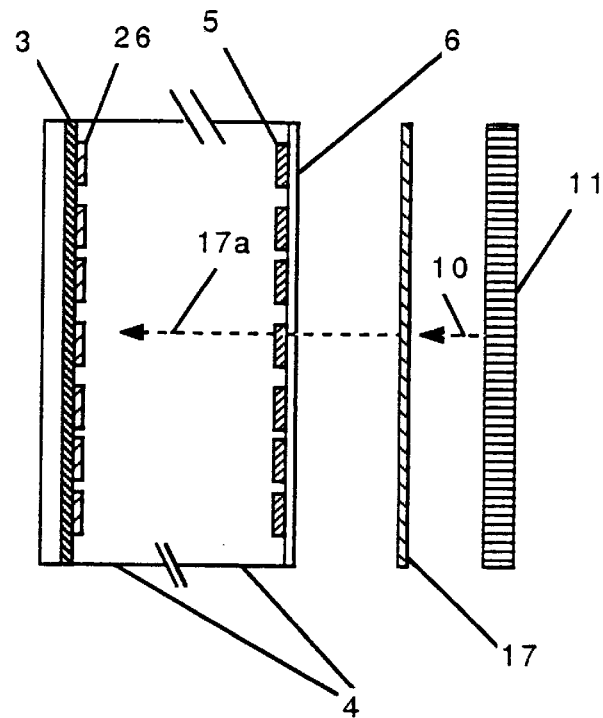
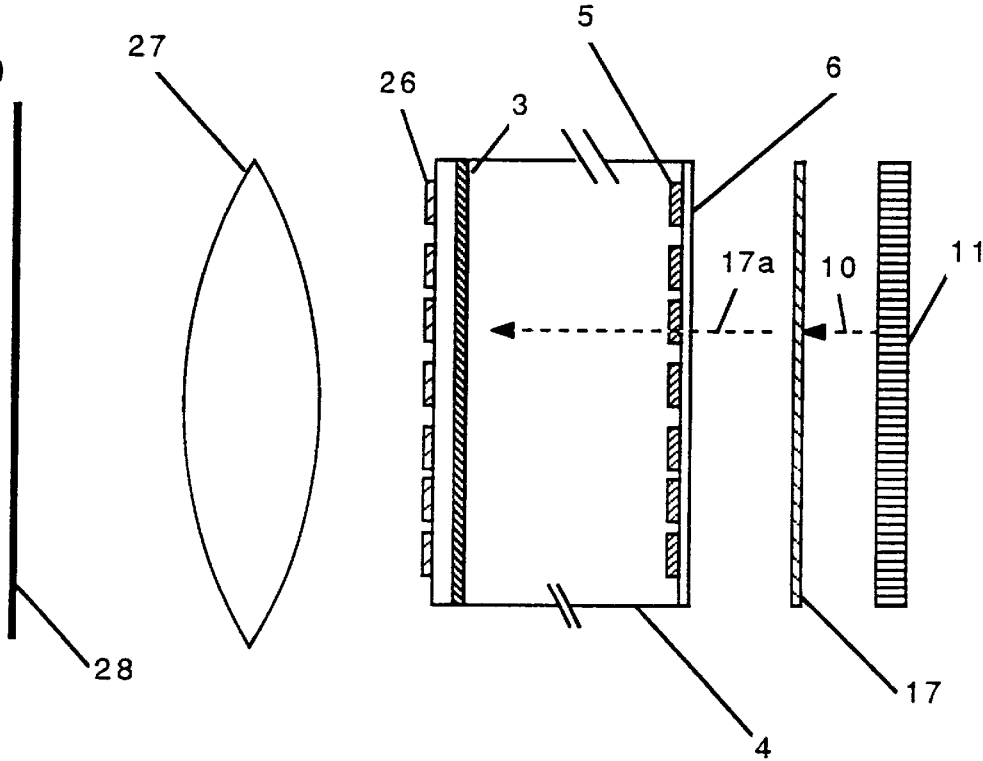
FIG. 19

TRIAD DETAIL
four layers of CLC in each sub-pixel (X, Y and Z)

X:
R.H. RED
L.H. GREEN
L.H. BLUE
L.H. RED

Y:
R.H. GREEN
L.H. RED
L.H. BLUE
L.H. BLUE

Z:
R.H. BLUE
L.H. RED
L.H. GREEN
L.H. BLUE

TRIAD DETAIL
five layers of CLC in each sub-pixel (X, Y and Z)

X:
R.H. GREEN
R.H. BLUE
L.H. RED
L.H. GREEN
L.H. BLUE

Y:
R.H. RED
R.H. BLUE
L.H. RED
L.H. GREEN
L.H. BLUE

Z:
R.H. RED
R.H. GREEN
L.H. RED
L.H. BLUE
L.H. BLUE

TRANSFLECTIVE LCD UTILIZING CHIRAL LIQUID CRYSTAL FILTER/MIRRORS

BACKGROUND OF THE INVENTION

1. Statement of the Invention

This invention relates to Liquid Crystal Display (LCD) devices and in particular to LCDs of the transflective type. Transflective LCDs are a dual mode display device. These devices operate either with the available ambient light in a reflective mode or with an internal light source in the transmissive mode. The devices of this invention use cholesteric liquid crystal filter/mirrors, to reflect, filter and direct polarized light within the devices. The embodiments of the invention provide improvements of brightness or battery life. This application is related to Disclosure Document 357140 filed in the Patent and Trademark Office on Jul. 15, 1994. The contents of Disclosure Document 357140 are hereby incorporated by reference herein. Many of the embodiments of this application were recorded in the Engineering Notebook of Dennis R. Hall on Sep. 22, 1992, this reference is also incorporated herein.

2. Description of the Prior Art

The methods of transmissive and reflective LCDs are well known, but the methods of the transflective LCD, being a combination of these methods is less well understood. FIG. 1 illustrates the components of the present day transflective LCD system. In the reflective mode, the room light 1 passes through the outside polarizer 2, which linearly polarizes the light 2a which then passes through the front electrodes 3 into the LCD cell 4. While cells having positive dielectric anisotropy are possible, for the sake of simplicity, it will be assumed that the cell 4 has the more popular negative dielectric anisotropy. Thus, when a cell of the LCD is in the "on" state, the cell has no effect upon the light passing through it. When the cell is "off", the light passing though the cell will be altered in some way, depending upon the nature of the light and the type of LCD. In the illustration of FIG. 1, the LCD cell 4 functions in what is known as the "wave guide mode" to rotate the plane of polarization of the light 2a and 7a passing through it 4 in the "off" state. The light 2a passing through the LCD cell 4 encounters the rear electrodes 5 and passes through the backplate 6, exiting the LCD. External to the LCD in this illustration is the inside polarizer 7. This 7 is also a linear polarizer, which is usually oriented orthogonally to the outside polarizer 2. If the LCD cell 4 is "on" the ambient light 2a passing to the inside polarizer 7, is absorbed. When the LCD cell 4 is "off", the light proceeds through the inside polarizer 7 to the half-silvered mirror 8. At the mirror 8, about 26 to 39% of this light 2a is reflected, having its polarization preserved. The reflected light then returns through the inside polarizer 7, through the LCD cell 4 ("off" state) and finally through the outside polarizer 2 to the viewer 9. Assuming excellent anti-reflection (AR) coatings on all surfaces and high efficiency polarizers (44%), only 8 to 12% of the ambient light that falls on the display is returned to the viewer 9. In most applications polarizers of somewhat lesser efficiency (38%) are used in order to have improved contrast, since the higher efficiency polarizers do not adequately polarize light of the entire visible spectrum.

In the transmissive mode, some of the light 10 from the light source 11, which is usually a Light Emitting Diode (LED), an Electroluminescent (EL) panel or a cold cathode fluorescent tube, passes through the half-silvered mirror 8 to the inside polarizer 7, the backplate 6 and into the LCD cell 4. When a cell 4 is "on" the Linearly Polarized Light (LPL) 7a passes unaltered to the outside polarizer 2 where it is absorbed. In the case where the cell 4 is "off", the plane of polarization is rotated and the light 7a passes through the outside polarizer 2 and to the viewer 9. In this case only about 10 to 25% of the light passes the half-silvered mirror 8 and all but 44% of this is absorbed by the inside polarizer 7. Finally the outside polarizer 2 passes nearly 90% of the aligned polarized light 7a. Thus, between 4 and 10% of the light is passed to the viewer 9 in the transmissive mode.

The low efficiency of the prior art is vastly improved by the methods of the invention. The efficiency is important because the size, weight and battery life of portable instrumentation are heavily dependent upon the efficiency of the instrumentation's display. The invention uses filter/mirrors comprised of Cholesteric type liquid crystal material. This material can more generally be called Chiral Liquid Crystals (CLC). Material having different color or polarization characteristics (specie) can be intermixed when each specific specie of the material is disposed in micro-capsules. However, most often the material is disposed in specie specific layers, with the layers superimposed coextensively to create the desired filter/mirror. The reflection characteristics of the CLC layers are illustrated in FIG. 3 and discussed in some detail by Schadt & Funfschilling cf. Schadt & Funfschilling, 1990 Jpn. J. Appl. Phys., vol. 29, No. 10, pp 1974–1984, New Liquid Crystal Polarized Color Projection Principle and Schadt & Funfschilling, SID 90 Digest, 1990, pp 324–326, Novel Polarized Liquid-Crystal Color Projection and New TN-LCD Operating Modes. When, properly aligned and deposited CLC layers are exposed to broad spectrum unpolarized light, the light of each CLC layer's spectral range is broken into equal amounts of Right Hand (RH) and Left Hand (LH) Circularly Polarized Light (CPL). Virtually all the light of one handedness is reflected over the spectral range. When the CLC layers are exposed to CPL, virtually all the CPL will be transmitted or reflected, depending upon the handedness and color of the light and specie(s) of the CLC. However, the reflected CPL does not experience a handedness change upon reflection from the CLC, as it would from a specular reflector (common mirror). Each specie of the CLC material has a color or center wavelength which is determined by the pitch length of the LC structure. This pitch can be adjusted by the amount of chiraling agent used in the synthesis of the CLC or by polymerizing the CLC at the temperature at which the CLC reflects the desired color, cf. Maurer, SID 90 Digest, 1990, pp 110–113, Polarizing Color Filters Made From Cholesteric LC-Silicones. The frequency or wavelength distribution (bandwidth) of the reflected light is a function of the birefringence of the CLC, which can be adjusted by the selection of the liquid crystal used. Any number of layers of the CLC can be superimposed to create the desired filter/mirror, including layers of both handednesses.

SUMMARY OF THE INVENTION

The first embodiment of the invention is illustrated in FIG. 2. This illustration is somewhat cumbersome, but because of its similarity in form and function to the prior art, it will serve to simply illustrate the similarities and differences between the invention and the prior art.

A LED light source 11 has been selected for the illustration in both cases, but in either cased a variety of other light sources could be used. The only stipulation being that the light source for the new art should be of a narrow emission band.

In FIG. 2, the ambient room light 1 enters the LCD 4 through the outside polarizer 12, which is a right hand circular polarizer, sending Right Hand Circularly Polarized Light (RHCPL) 12a into the cells 4 of the LCD. The cells 4 that are "on", pass the light 12a through the LCD 4 unaltered as in the case of the prior art. But the LCD 4 of this embodiment is fashioned such that an "off" cell forms a birefringent half wave element, which converts the RHCPL to Left Hand Circularly Polarized Light (LHCPL). The light 12a then passes through the exit electrodes 5, the backplate 6 and encounters a two layer filter/mirror 13. The filter/mirror 13 is comprised of two CLC layers 14 and 15, the characteristics of which are illustrated in FIG. 3.

In this embodiment, a red LED backlight 11 was selected and the two layer filter/mirror 13 was made to transmit the red light 17a, derived from the polarization of the light 10 from the backlight 11 in FIG. 2. The two layer filter/mirror 13, as illustrated, will reflect about 48% of all incident light over about 90% of the human eye response corrected spectrum, leaving a notch or transmissive area in the red. The transmissive area corresponds to the spectral distribution of the red LED light 10, which is shown as the spectral distribution 16 in FIG. 3.

In FIG. 2, the switching logic of the prior art case is retained and the two layer filter/mirror 13 is made to reflect LHCPL in the blue and green region. Thus, when the LCD cells are "on" and the Right Hand Circularly Polarized (RHCP) ambient light 12a enters the cell 4, the light 12a is unaltered and travels through the exit electrodes 5, the backplate 6 and the two layer filter/mirror 13 to the inside polarizer 17. This 17 is a Left Hand (LH) circularly polarizing filter that absorbs the RHCP ambient light. However, then the cell 4 is "off", the light 12a passing through the LCD 4 cell, has its handedness changed. Thus light 12a becomes LH circularly polarized and when encountering the two layer filter/mirror 13, the blue and green colors of the light 12a are reflected, retaining its LH circular polarization. The reflected light passes back through the backplate 6 and exit electrodes 5, into the LCD cell 4. The cell 4 being "off", changes the handedness of the light, returning it to RHCPL, which can pass through the outside polarizer 12 to the viewer 9. The red ambient light 12a passed through the two layer filter/mirror 13 and inside polarizer 17, into the light source 11 region where it is absorbed or returned through the cell 4 to the viewer. Using the same efficiency criterion as in the prior art case, one finds that about 33.5% of the ambient light is returned to the viewer, as compared to the 8 to 12% in the earlier case, for about a three times improvement.

In the transmissive case the improvement is even greater, since the two layer filter/mirror 13 has no effect upon the transmitted circularly polarized red light 17a. Thus, the method of operation and the efficiency is the same as a conventional "transmissive only" LCD or about 39%, compared to the 4 to 10% figures found for the transflective device in this mode. This yields an average improvement of about seven times. However, one should note that these comparisons may not be directly equivalent, since the spectral distribution of the reflected and transmitted light are not spectrally the same. The device of the prior art can reflect or transmit light across the entire spectrum, whereas the invention excludes from reflection, the spectral region transmitted by the device. Thus, depending upon which spectral region is transmitted, the reflective efficiency can be impacted to a greater or lesser extent. On the other hand, the new art does present an advantage relative to the transmissive only LCD in that, in the transmissive mode the brightness of the cell is further increased by the light reflected by the cell. As long as there is some ambient light, the devices of this invention will be brighter than the "transmissive only" LCD device.

Aside from an AR coating on the outside polarizer 12, no AR coatings are required, because the outside polarizer will absorb the undesired reflected light. Although some AR coatings may be desirable to enhance the efficiency.

In the illustrations of FIGS. 1 and 2, the polarizers and reflectors are shown external to the LCD. In this case a very thin backplate 6 must be used to minimize parallax induced viewing problems. However, the CLC filter/mirrors of the present invention are compatible with the nematic LCs of the LCD. They can also be made very thin ( as thin as one micron per layer), so that they could be incorporated within the LCD cell (deposited upon the cell's electrodes) without severely impacting the switching sensitivity of the cells. This then eliminates the parallax problems and greatly enhances the viewing angle of these devices, in the reflective viewing mode. Most of the devices of the preferred embodiments, will be illustrated with the CLC filter/mirrors incorporated within the LCD cells.

DESCRIPTION OF THE DRAWINGS

FIG. 6 is an illustration of the invention as it may be applied for a full color LCD.

FIG. 7 is an illustration of the invention as it may be applied for a full color LCD operating in the "wave guide" mode.

FIGS. 8 illustrates the reflective spectral distribution curves for a family of the CLC color filter/mirrors.

FIG. 11 illustrates the white light distribution from using the narrow band color filter/mirror system.

FIG. 12 illustrates the half tone characteristics of using the LCD cell in the birefringence mode.

FIG. 14 illustrates the triad details for the embodiments of FIGS. 13.

FIG. 18 illustrates the embodiment of a novel transmissive LCD.

FIG. 19 illustrates the above embodiment in a projection application.

PREFERRED EMBODIMENTS OF THE INVENTION

Figure 4:
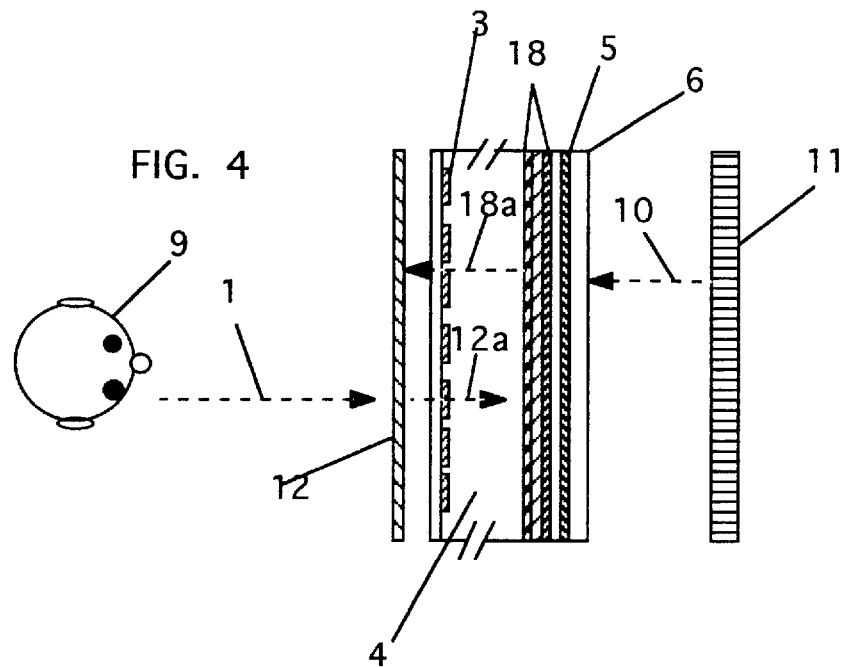
FIG. 4 is an illustration of a simplified embodiment of the invention.

One way to eliminate the inside polarizer 17 of the initial embodiment, is illustrated in FIG. 4. The two layer filter/mirror 13 is changed to a three layer filter/mirror 18, comprising the two previously described layers and an additional layer to polarize the backlight 10. The three layer filter/mirror 18 is comprised of CLC layers which reflect LHCP blue and green light and a layer that reflect RHCP red (light source) light. The last layer then transmits the LHCPL of the light source 11 through the three layer filter/mirror 18, while reflecting the RHCPL of the source light 10, back to the source 11. The light source area 11 should be generally light absorbing, to minimize the ambient light 1 that passes through the three layer filter/mirror 18 into the light source region 11, from being reflected and passing back through the three layer filter/mirror 18 to degrade the contrast of the display. This may be minimized by retaining the design of FIG. 2, but placing the two layer filter/mirror 13 within the LCD cells 4 as illustrated with the placement of three layer filter/mirrors 18 in FIG. 4. As broader band CLC materials become available, the two layer filter/mirror can obviously be constructed as a single layer filter/mirror and the three layer filter/mirror can be made as a two layer filter/mirror. Work on such broad band materials are evidenced by the papers of D. Coates et al, D. Coates, M. J. Goulding, S. Greenfield, J. M. Hammer, S. A. Marden and G. L. Parri, SID 96 Applications Digest, 1996, pp 67–70, High Performance Wide-Band Reflective Cholesteric Polarizers and Li et al, L. Li and S. M. Faris, SID 96 Applications Digest, 1996, pp 111–113, Single-Layer Super Broadband Reflective Polarizer.

In the reflective mode, the ambient light 1 impinges on the outside polarizer 12, which transmits RHCPL 12a into the cell 4. When the cell 4 is "on" the light 12a is unaltered and passes to the three layer filter/mirror 18, which passes the light 12a into the absorptive light source 11. When the cell 4 is in the "off" state, the light 12a entering the cell 4 is converted to LHCPL and the blue and green colors of the light 12a are reflected by the three layer filter/mirror 18. The red LHCPL 12a proceeds through the filter/mirror 18 and is absorbed in the light source 11.

In the transmissive mode the light 10 from the light source 11 is circularly polarized by the three layer filter/mirror 18. This LHCPL 18a is of a single color (red in this example). When the cell 4 is "on" the light 18a is unaltered by the cell 4 and passes to the outside polarizer. Since the outside polarizer 12 transmits only RHCPL, the light 18a is absorbed and the viewer sees a black pixel. However, when the cell 4 is in the "off" state, the light 18a entering the cell 4 is converted to RHCPL, which is transmitted by the outside polarizer 12, to the viewer 9.

The principal embodiments of this invention uses birefringent LCD cells 4, which have certain advantages, cf. Schadt & Funfschilling references. However, many of the present day commercial LCDs operate in the wave guide mode. In this mode the LCDs have less spectral sensitivity and greater tolerance on the thickness of the LCD cells. Thus, a version of this invention that operates in the wave guide mode is presented in FIG. 5. This embodiment is illustrated with the CLC filter/mirrors located external to the LCD, since methods are not available to fabricate a suitable quarter wave element 19, within the LCD cell 4.

In the reflective mode, the ambient room light 1 is linearly polarized by the outside polarizer 2 before entering the LCD cell 4. When the cell 4 is "on", the light 2a passes unaltered through the cell 4, the exit electrodes and the backplate 6. The LPL 2a then encounters the quarter waveplate 19 such that its 19 optical axes are oriented at an angle of 45° to the plane of polarization of the LPL. The quarter waveplate converts the LPL to RHCPL. This light then encounters the three layer filter/mirror 18, which passes the light into the absorptive light source area 11. However, when the cell is in its "off" state, the plane of polarization is rotated 90° by the LCD cell 4. This places the plane of polarization at an angle of −45° to the optical axis of the quarter waveplate 19, changing the polarization of the light 2a to LHCPL. This light 2a then encounters the three layer filter/mirror 18, using the same species of CLC described earlier, the filter/mirror 18 reflects the LHCP green and blue light back to the quarter waveplate 19. The red light 2a is transmitted into the light source 11, where it is absorbed. The reflected LHCPL enters the quarter waveplate 19 and becomes linearly polarized light 19a, with its plane of polarization oriented orthogonally to the plane of transmission of the outside polarizer 2. When this light 19a passes through the "off" LCD cell 4, the plane of polarization is rotated and becomes aligned to the transmitted axis of the outside polarizer 2, so that it 19a can pass to the viewer 9. In the transmissive mode the light 10 from the light source 11 is circularly polarized by the three layer filter/mirror 18. This LHCPL is of a single color (red in this example), which is then converted to LPL 19a by the quarter waveplate 19. When the LCD cell 4 is "on" the LPL 19a from the light source 11 is blocked by the outside polarizer 2, but when the cell is "off" the LCD cell 4 rotates the plane of polarization of the light 19a through 90°. This then aligns the plane of polarization of the light 19a to that orientation that is transmitted by the outside polarizer 2 and the light 19a passes to the viewer 9.

With properly bonded filters the efficiency of this system is better than either the conventional reflective or transmissive LCDs. This is because the CLC filter/mirror 18 used as either a polarizer or as a reflector, is more efficient than even the best absorptive polarizers. The table below illustrates, how the devices thus far described, compare to the state of the art LCDs.

Figure 1:
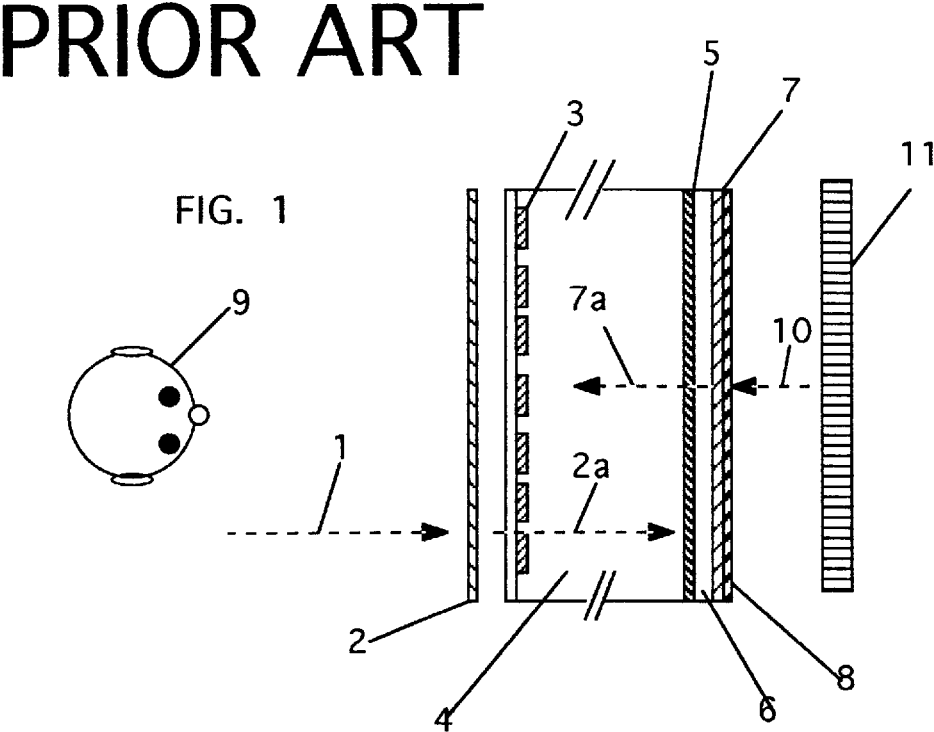
FIG. 1 is an illustration of the prior art in transflective LCD devices.
Figure 2:
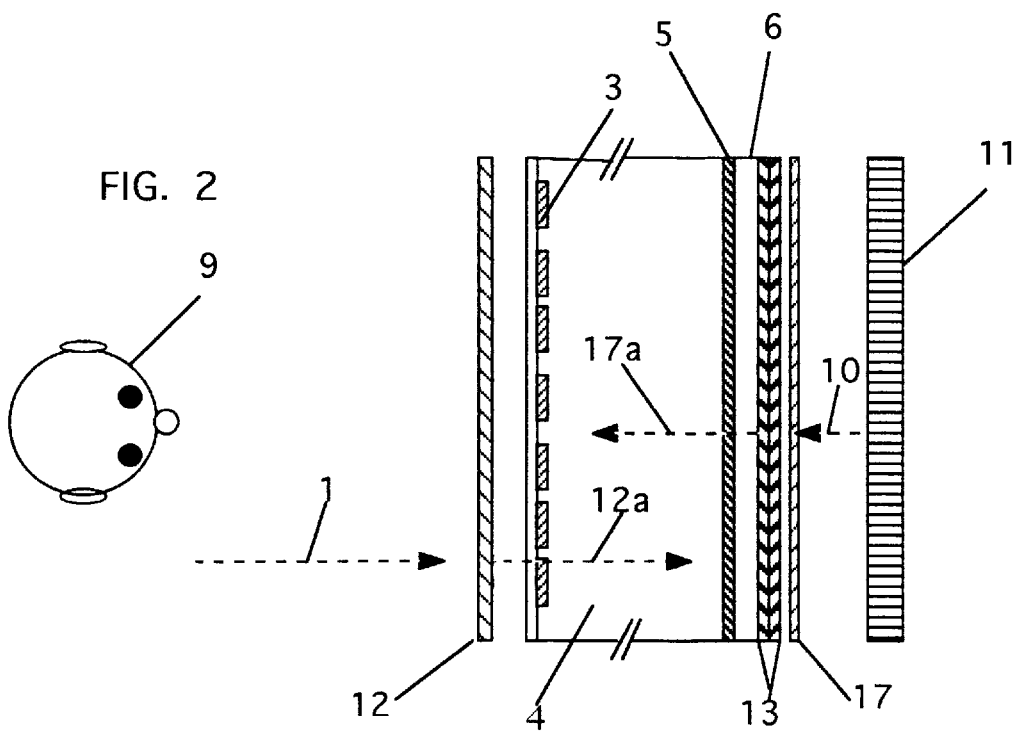
FIG. 2 is an illustration of a cumbersome embodiment of the invention.
Figure 3:
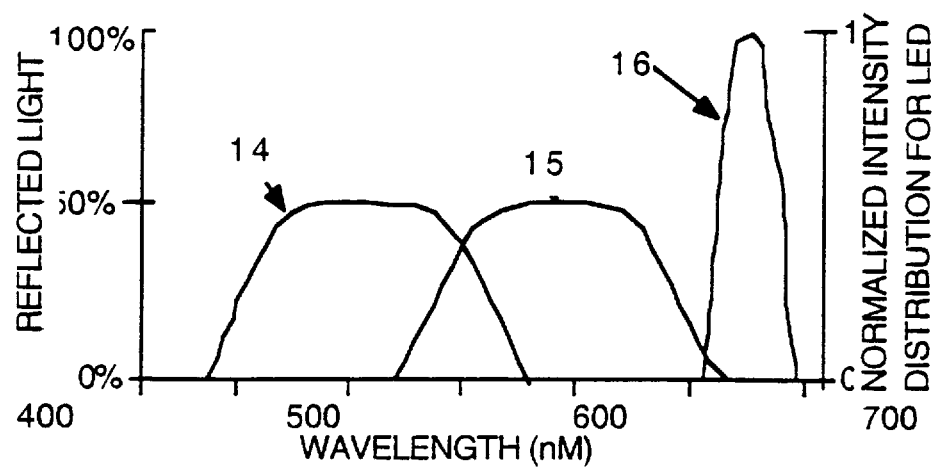
FIG. 3 is a graphic representation of the spectral distributions of the light reflected from LC filter/mirror layers and that of the light source of a LCD.
Figure 5:
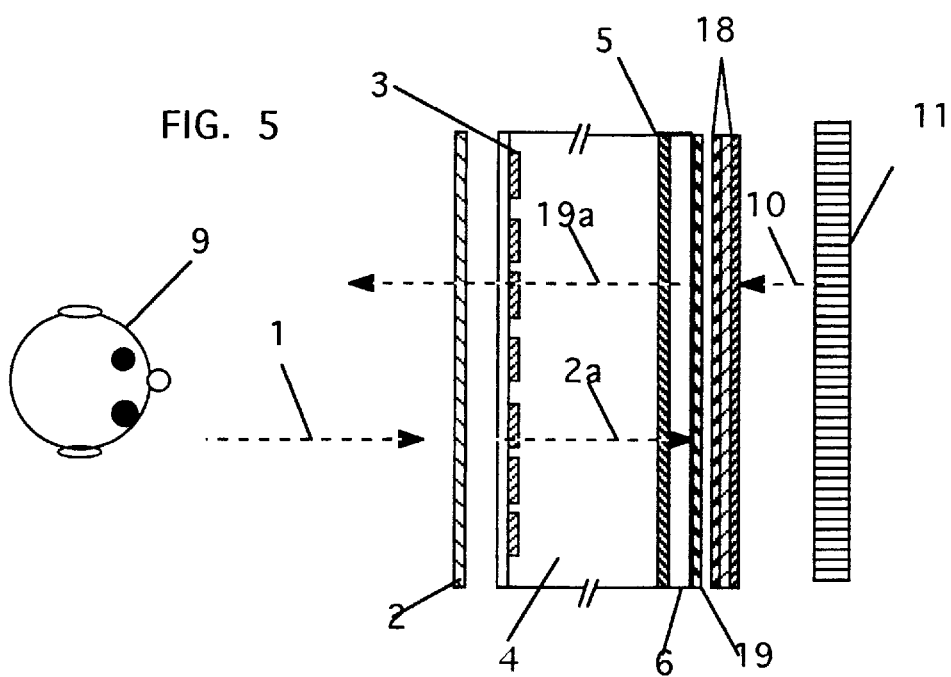
FIG. 5 is an illustration of the invention in which the LCD functions in the wave guide mode.

|  | Conventional Transflective | Conventional Single Mode | Device of FIG. 2 | Device of FIG. 4 | Device of FIG. 5 |
| --- | --- | --- | --- | --- | --- |
| Transmissive | 4–10% | 39% | 39% | 42% | 40% |
| Reflective | 8–12% | 28.5% | 33.5%* | 33.5%* | 30.5%* |

*These figures are valid for a red backlight and the use of most other color backlights will diminish these figures.

Note that these devices, including the conventional transflective device, can operate in both modes at the same time. Thus, the apparent brightness can be more than double that of the fixed mode devices.

The Maurer reference describes a special CLC formulation which can be applied in thin layers by a number of means and then made solid by cross-linking the molecules, whereupon other thin layers can be applied and made solid, until one has the desired filter/mirror. This process enables one to fabricate extremely thin filter/mirrors, which are essential for designs incorporating the CLC filter/mirrors within the LCD cells. This material is marketed by Wacker Chemie.

Another preferred embodiment is that of the full color transflective LCD. This is largely any of the above devices in which the CLC color filter/mirrors can be placed in the individual cells, so that triads of color elements are created. Two of these embodiments are illustrated in FIGS. 6 and 7.

The device of FIG. 6 operates in a birefringence mode, where the color cells switch from a state of having no effect upon the light 12a and 17a passing through them ("on" state) to becoming a half wave element ("off" state). A halfwave element changes one handedness of CPL to the other, orthogonal handedness. In the embodiment of FIG. 6, some of the ambient room light 1 passes through the outside polarizer 12 becoming RHCPL 12a, which passes unaltered through an "on" cell 4. This light 12a proceeds to the CLC color elements 20, which reflect LHCPL. The light 12a continues to the inside polarizer 17 where it is absorbed. When the cell 4 is in the "off" state, the light 12a passing through it 4 has it handedness changed to LHCPL wherein one color of which is reflected by the color element 20. The unreflected light 12a proceeds to the inside polarizer 17, which transmits the light 12a into the light source 11, where it is absorbed or reflected. In the transmissive mode, light 10 from the light source 11 is polarized to LHCPL by the inside polarizer 17. This light 17a passes through the backplate 6 and rear electrodes 5 to the CLC color elements 20, which reflect one color of the LHCPL 17a back through the inside polarizer 17 into the light source 11. The light 17a that was not reflected by the color element 20 is of the complementary color to that which was reflected. This light 17a enters the LCD cell 4. If the cell 4 "on", the light 17a is unaffected and is absorbed by the outside polarizer. When the cell 4 is "off", the handedness of the LHCPL 17a is changed to RHCPL and the light 17a is transmitted by the outside polarizer 12, to the viewer 9.

The device of FIG. 7 operates in the wave guide mode, where the outside polarizer 2 is a linear polarizer and the plane of polarization is rotated when the LCD cells 4 are switched. But, since the CLC color elements 20 reflect CPL, the LPL must be changed to CPL by a quarter waveplate 19. The waveplate 19 and the color elements 20 are shown external to the LCD cell 4. Depending upon the orientation of the LPL 2a to the optical axis (±45°) of the waveplate 19, either RHCPL or LHCPL reaches the CLC color elements 20. As noted, the LCD cell 4 controls the orientation of the LPL 2a relative to the waveplate 19. With the transformation of LPL to CPL and CPL to LPL, being made by the quarter waveplate 19, this device operates the same as the device of FIG. 6, in both the reflective and transmissive modes.

Like the monochrome transflective devices of the invention, the color embodiments of the invention yield displays of complimentary color in the reflective and transmissive modes. Thus when there is sufficient ambient light and the backlight is turned "on", a black and white display may result. The embodiment of FIGS. 6 and 7, produce light described as being of a complementary color between the transmissive and reflective modes. As so configured, the light from the individual LCD cells is comprised of two of the three colors. This arrangement has a twofold effect. First, the saturation of the colors in the transmissive mode are considerably reduced, resulting in a reduced color gamut. Secondly, brightness of the transmissive display can be greatly increased, by re-configuring the video color signals. This then allows the use of less backlight and improved battery life in portable units.

FIGS. 8 illustrate the reflective spectral distribution of a family of CLC filter/mirrors, when exposed to unpolarized white light. The individual curves illustrate the basic characteristic of the CLC filter/mirrors. FIG. 8A illustrates the red reflecting CLC, whereas FIGS. 8B and 8C illustrate the characteristics of the green and blue reflecting material, respectively.

Figure 9A:
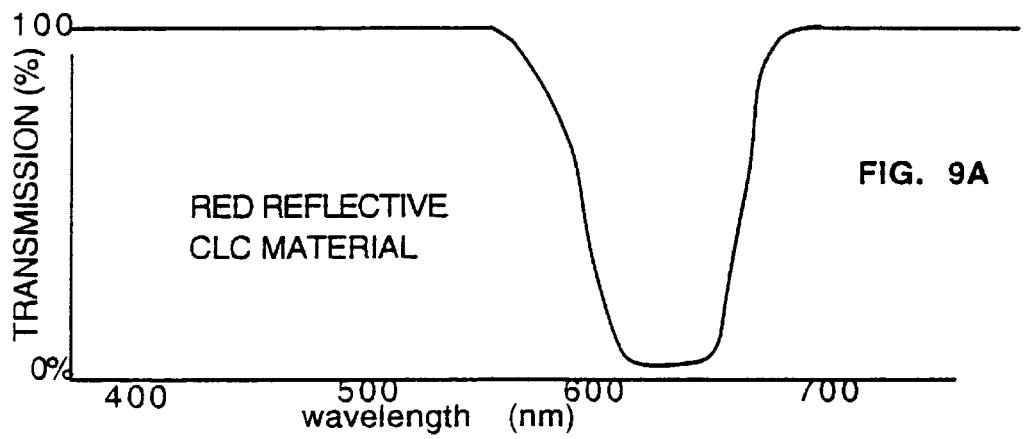
FIGS. 9 illustrate the transmission spectral distribution curves for a family of the CLC color filter/mirrors.
Figure 9B:
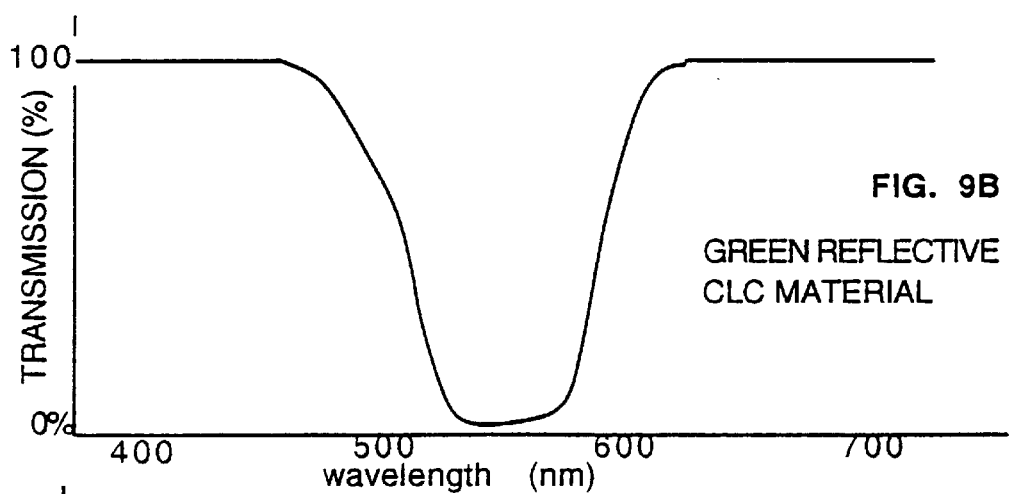
Figure 9C:
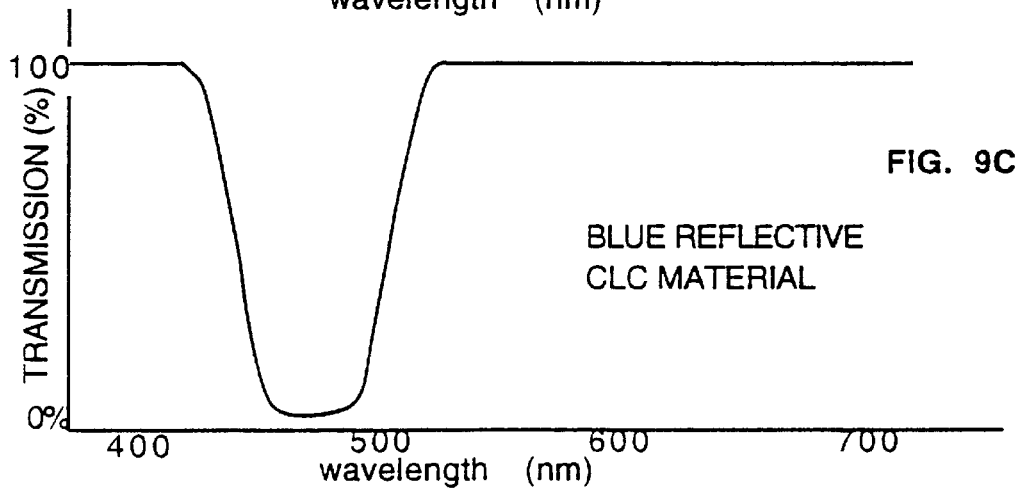
Figure 10:
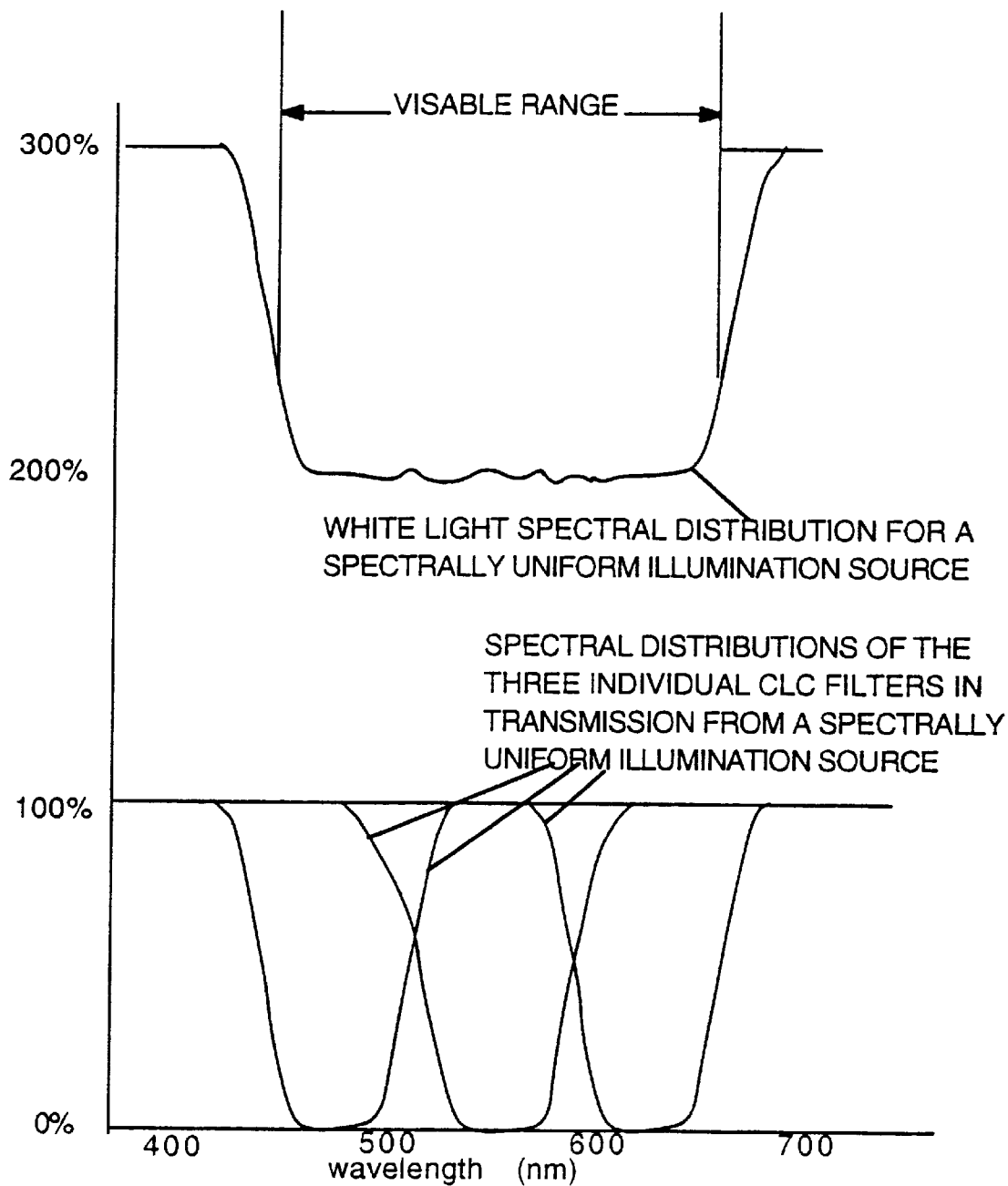
FIG. 10 illustrates the white light spectral distribution and intensity from using the complementary (broad band) color filter/mirror system.

FIGS. 9 illustrate the transmission characteristics of the individual color cells or sub-pixels for a white backlight 11, having a handedness that is reflected by the CLC color element 20 of FIGS. 6 or 7. The transmitted colors are those colors that are not reflected by the specific color element(s) 20 of the individual LCD cell 4. When viewed or measured at the pixel level (comprised of the three color sub-pixels), the white brightness is doubled, as illustrated in FIG. 10. FIG. 10 also shows the individual distributions of FIG. 9, consolidated on one graph, illustrating how the individual distributions combine to double the brightness of the transmissive display. The doubling of brightness results from having each sub-pixel transmitting light of two primary colors. In this case a sub-pixel only removes the light of one color from the illuminating light 10, rather than the usual light of two colors. However, the method results in a greatly reduced color gamut. Yet, for the situation where the brightness of battery operated LCD's is marginal or the battery life must be lengthened, this compromise is reasonable. In this instance, the complementary color format is used only in the transmissive mode, where power consumption by the display backlight is high.

FIG. 11 illustrates a reflective white light spectral distribution 25, comprised of the individual spectral distributions of the color elements 20 within a three color element pixel of the display.

These displays can generate halftone or intermediate color states. FIG. 12 illustrates the switching of the LCD cell 4 from "on" to ⅛ wave beyond "off". The ⅛ wave beyond the "off" state is achieved by making the cell 4 that has sufficient retardation to produce an additional ⅛ wave retardation beyond that which is generally required. In the operation of a cell 4, such as illustrated in FIG. 6, the "off" state is a slightly biased state, that is nevertheless referred to as the "off state". RHCPL 12a from the outside polarizer 12 is passed through a LCD cell 4 to a CLC color element 20. When the cell 4 is "on" the light passes through the cell 4 unaltered (no retardation) and the light passes through the CLC color element 20 into the inside polarizer 17 or the light source 11. When the cell 4 produces a ½ wave of retardation, the light 12a of specific colors, is reflected by the CLC color element 20. FIG. 12 illustrates that between the fully switched states, the amount of light reflected from the color elements 20, varies as the $\sin^2$ of half the retardation angle, e.g. 90° for a ½ wave (180°) of retardation. FIG. 12 also shows the configuration of the light 12a at the CLC color element(s) 20. Elliptically Polarized Light (EPL) of either handedness can be modeled as a combination of LPL and CPL. The light is modulated by virtue of the fact that all the LHCPL and half of the LPL is reflected by the color element 20 as LHCPL and all the light transmitted by the color element 20 is RHCPL. Thus, as the retardation of the cell 4 is increased and the amount of right hand and/or linear components of the light is reduced, more LHCPL is reflected by the color element 20, as illustrated.

It might also be noted that the cell 4 can be easily adjusted to compensate for chromatic path length differences between the sets of color cells by varying the thickness of the CLC color elements 20. This is possible since thickness variation in the required range has no effect upon the color elements 20 characteristics. Thus, cells or each color can be made that are very nearly perfect half wave retarders, having the same bias voltage applied to the cells of a pixel.

Figure 13A:
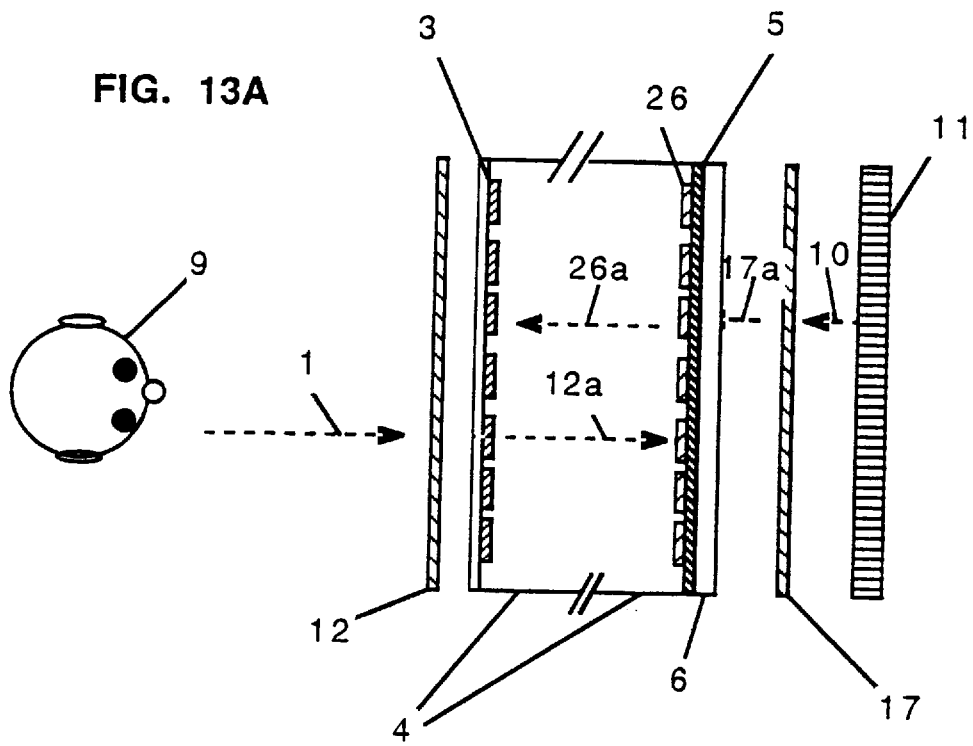
FIG. 13A illustrates a high brightness color transflective device.

Another embodiment of the invention is a transflective device offering its best performance in the reflective mode. This embodiment is very similar to the device of FIG. 6 and it can be configured that way or in a number of other ways (four ways for each combination of triad filter/mirrors). For illustration, the configuration of FIG. 13A was chosen. The unique aspect of this embodiment is that the triad color elements are comprised of three layer filter/mirrors, as illustrated in FIG. 14. These filter/mirror layers are superimposed, as are the two layer filter/mirrors of FIGS. 2 & 4 and the three layer filter/mirrors of FIGS. 5 & 6, but the extent of these filter/mirrors, as illustrated in FIG. 13A is limited to the individual color elements. The most unique aspect of this embodiment is that in the reflective mode, all of the sub-pixels are always reflecting light. In addition, the sub-pixels can reflect light of two colors, so the effect is up to a five fold increase in the reflected light flux, but with reduced brightness contrast.

Figure 15:
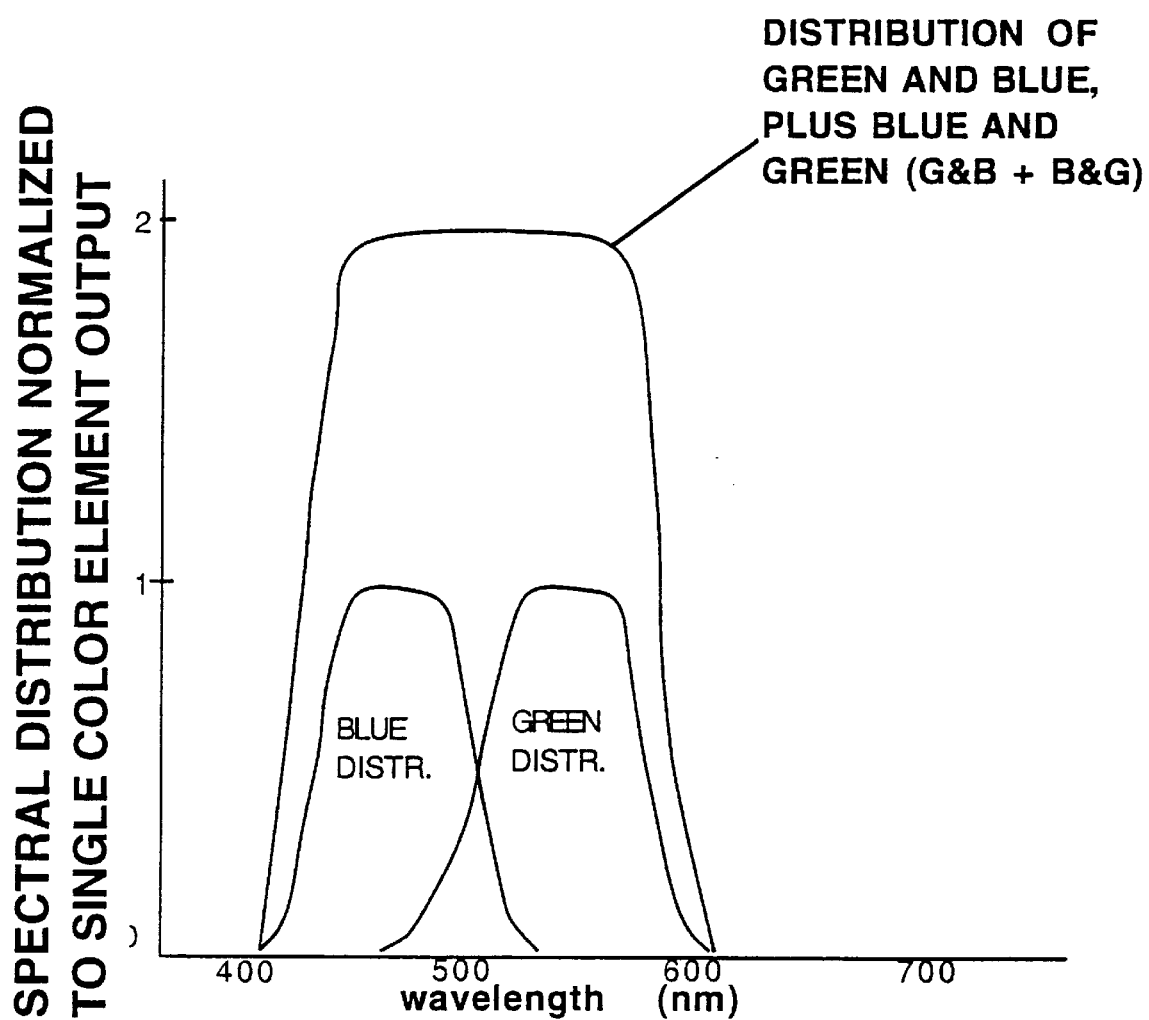
FIG. 15 illustrates the spectral distribution of a high brightness triad producing a complementary color.
Figure 16:
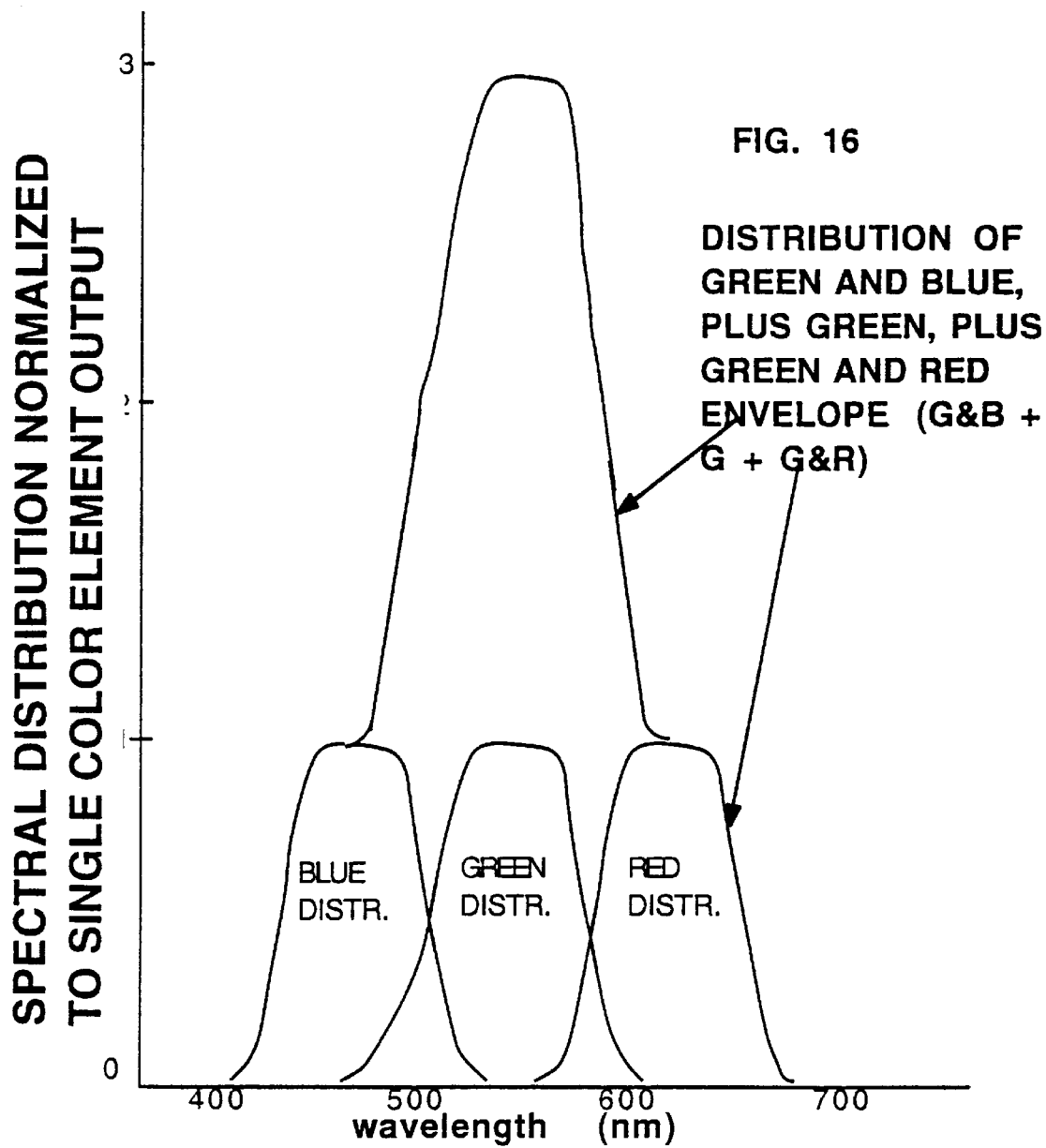
FIG. 16 illustrates the spectral distribution of a high brightness triad producing a primary color.

The operation of this embodiment is much like the previous examples. The room light 1 is right hand circularly polarized by the outside polarizer 12 and when a cell 4 is "on" the light 12a is unaltered as it passes through the cell 4. When the light 12a reaches the color elements 26, sub-pixel "X" reflects red, sub-pixel "Y" reflects green and sub-pixel "Z" reflects blue. The colors of light 12a not reflected in each sub-pixel are transmitted to the inside polarizer 17 where they are absorbed. When a LCD cell 4 is "off" the light 12a is changed to LHCPL and sub-pixel "X" reflect both the green and blue components of the light 12a impinging upon it. Sub-pixel "Y" reflect the red and blue components of the light 12a and the sub-pixel "Z" reflect the red and green components of the light 12a. When the reflected light traverses back through the "off" cell, this light is again converted to RHCPL, which is transmitted by the outside polarizer 12 to the viewer 9. The component colors of light 12a not reflected at the individual sub-pixels, pass through the inside polarizer 17 to the light source 11, where it is absorbed. Since the three sub-pixels can be switched to two levels, there are eight fully switched states each triad can produce. This is illustrated in Table I, by designations of states "A" through "H". The spectral distributions from a pixel can be configured in four basic ways. First is a background, or low level "white state" distribution, where each sub-pixel produces only one color, yielding a spectral distribution 25 as illustrated in FIG. 11. Secondly, is a configuration wherein the light from the pixel is comprised of two colors as illustrated in FIG. 15. In this configuration the colors are produced in combination (two colors) within one sub-pixel with each of the other sub-pixels producing one of the two colors. The third configuration involves creating colors derived from all three colors as illustrated in FIG. 16. In this configuration the colors are produced in combination within two sub-pixel with the other sub-pixel producing one of the three colors, that color being the principal color of the distribution. Note that the spectral distribution of this three color configuration includes the entire spectrum, with a significant spectral peak in one color, that color being the color principally perceived by the viewer. The flux from the skirts of the distribution serve to enhance viewability of that color, although the color is considerably less saturated, than if the skirts of distribution were not present. The emphasis is upon viewability, not color purity. The fourth configuration is a "super white" state, wherein each sub-pixel produces two colors. The distribution is essentially the same as illustrated in FIG. 11, but the brightness is twice as great as the earlier configuration. A display having a two to one or less brightness contrast may be considered inadequate by some people, until they consider other factors. These factors are the viewability of color contrast displays at monotonic brightness levels and the intended applications for such displays. These applications are for low power consuming color displays in low ambient light environments.

Figure 13B:
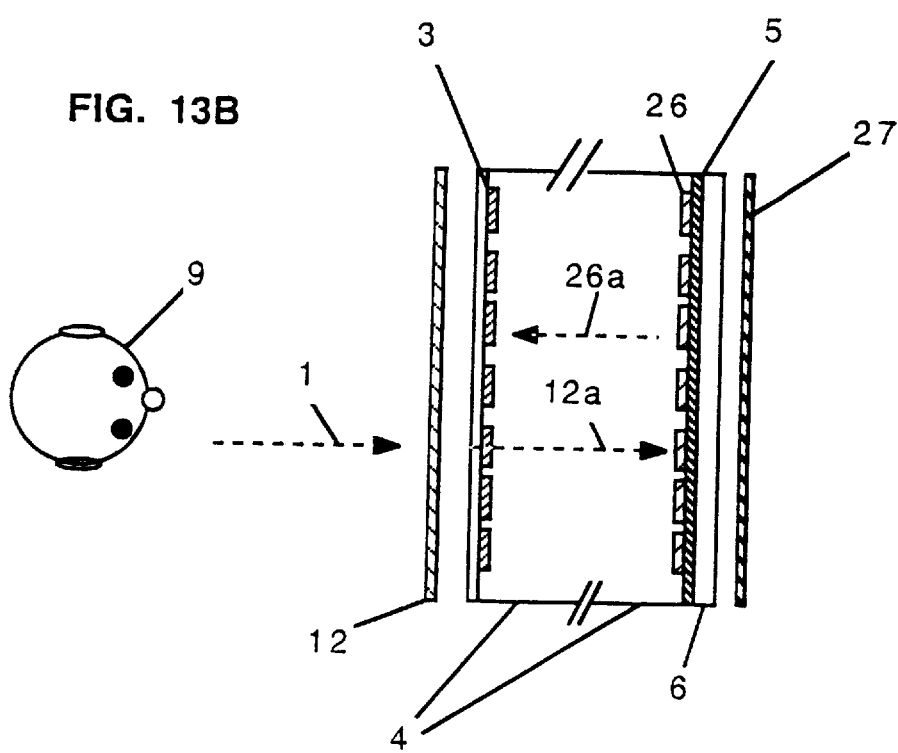
FIG. 13B illustrates a variation of the embodiment of FIG. 13A optimized for reflective mode viewing.
Figure 17:
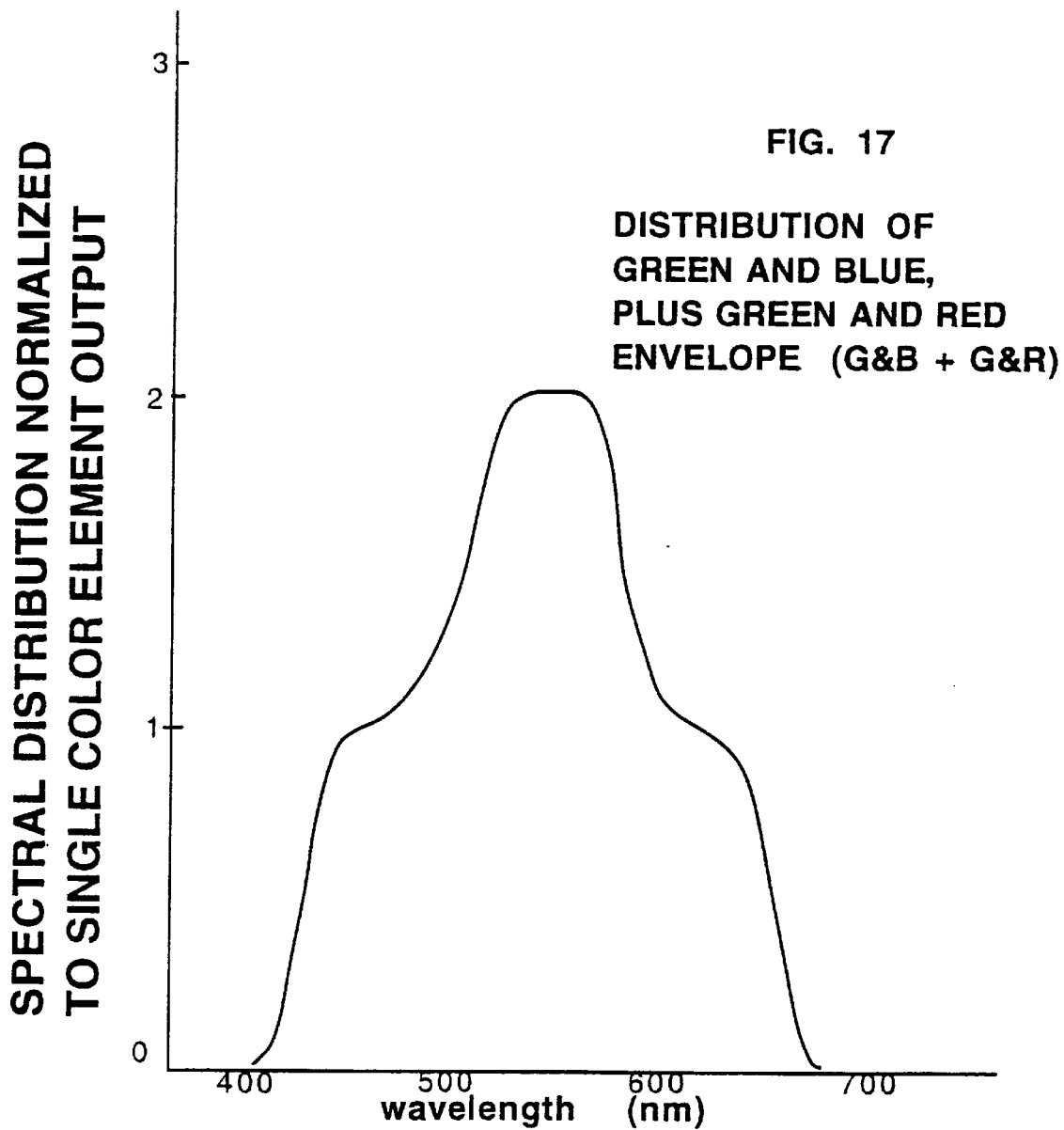
FIG. 17 illustrates the spectral distribution of a high brightness triad producing a primary color in a further embodiment of the invention.

In the transmissive mode of the device of FIG. 13A, the backlight is polarized to LHCPL by the inside polarizer 17. Thus, the light going through the sub-pixel "X" is LHCP red light, the light at sub-pixel "Y" is LHCP green light and light at sub-pixel "Z" is LHCP blue light. Then, if the LCD cell 4 is "on", this light 17a is unaffected by the cell 4 and travels to the outside polarizer 12, where it is absorbed, providing a "black" state. When the cell 4 is "off" the LHCPL is changed to RHCPL and is transmitted through the outside polarizer 12 to the viewer 9. Table I shows the color of the light relative to the switched state of the display. This embodiment behaves as a conventional transmissive LCD in every way. By changing the handedness of the inside polarizer 17, one can select a transmissive display utilizing colors derived from either primary color sub-pixels or complementary color sub-pixels. As illustrated above, the sub-pixels yield the primary colors. By changing the handedness of the inside polarizer 17 to produce RHCPL, the complementary colors, such as the cyan (aqua), magenta (purple) and yellow, are produced in the transmissive mode. When this is done, the reflective characteristics remain unchanged, but the primary colors, although desaturated, have a four fold increase in their luminous flux, while still maintaining a black field capability. This brightness increase is illustrated by the distribution of FIG. 17. The purity of these colors is reduced due to the fact that half of the light flux is in the skirts of the spectral distributions. The colors and switching logic are shown in Table II. As noted the embodiment of FIG. 13A best performs in the reflective mode and in the event that only the reflective mode were to be used, one could improve the color contrast slightly by replacing the inside polarizer 17 and the light source 11 with a light absorber 27 as is illustrated in FIG. 13B. This modification could also be made to other embodiments of the invention.

The final embodiment of the invention is not a transflective device, but it is closely related to the aforementioned techniques. This is a high brightness transmissive device, well suited for projection displays. It is potentially a very low cost device. The embodiment is illustrated in FIG. 18 & 19, and the display's characteristics are presented in Table III. The performance characteristics for the device in the transmissive mode are the same as those of the embodiment of FIG. 13A in the reflective mode. But unlike other embodiments, the color elements 26 are on the output side of the LCD. Note, that in the embodiment of FIG. 19, these color elements may even be placed upon the outside of the LCD, provided a thin faceplate is used and the light source is reasonably well collimated. Another possibility in this embodiment is the use of a CLC inside polarizer, where the inside polarizer consists of merely a three layer filter/mirror of RHCPL reflecting material. This filter then allows a simple, low cost, high efficiency light system by merely having some of the light (RHCPL) reflected from the polarizing filter returned to the filter after being reflected from a mirror, wherein its handedness is changed to LHCPL. This embodiment constitutes a very low cost color display, providing nearly the same brightness and cost as a black and white display. The color capability can be increased at the expense of the display resolution. For the present three cell triad, with three levels of filter/mirrors there are eight switching states, but if the number of sub-pixels in the color pixel is increased together with the number of filter/mirrors within each sub-pixel, then more color/switching states are possible. The number of switching states is two to the power of the number of sub-pixels in the pixel, so that a six sub-pixel display will yield 64 switched states and as many different color states. The great limitation for these "always on", high brightness embodiments, is their inability to do halftones or color modulation. This is because a sub-pixel is never "off" and the color can only be switched between complementary colors. Thus modulating the polarization of a switching cell 4, desaturates the color of a sub-pixel, with all sub-pixels desaturating to white.

The operation of this cell is very similar to that of other embodiments. The pixel format can be the same and is shown in FIG. 13A, wherein the operation of the embodiment is as follows: In FIGS. 18 and 19, the light 10 from the light source 11 passes through the inside polarizer 17, becoming LHCPL 17a. The light 17a traverses the backplate 6 and rear electrodes 5, entering the LCD switching cell 4, where it 17a is either unaffected by the cell 4 ("on" state) or it has its 17a handedness changed to RHCPL ("off" state). One state transmits a primary color to the viewer 9 or the projection lens 27 and screen 28, while the other state transmits the complementary color. Each sub-pixel displays a different primary and complementary color set. For the triad format of FIG. 14, this yields the color/switching as described in Table III.

Figure 20A:
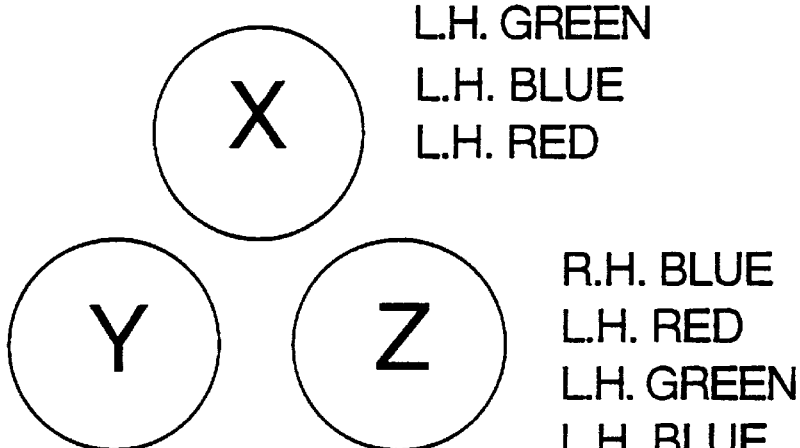
FIG. 20A illustrates the triad details of the embodiments of FIGS. 18 and 19, configured to produce high brightness, complementary color display.
Figure 20B:
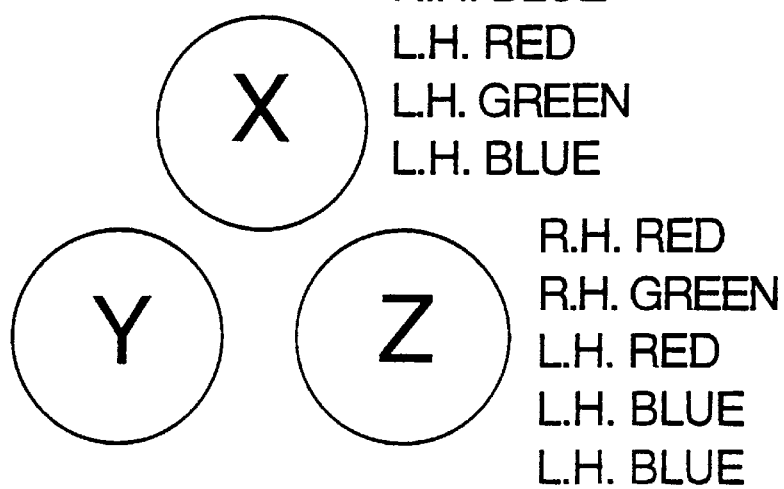
FIG. 20B illustrates the triad details of the embodiments of FIGS. 18 and 19, configured to produce a primary color display.
Figure 21:
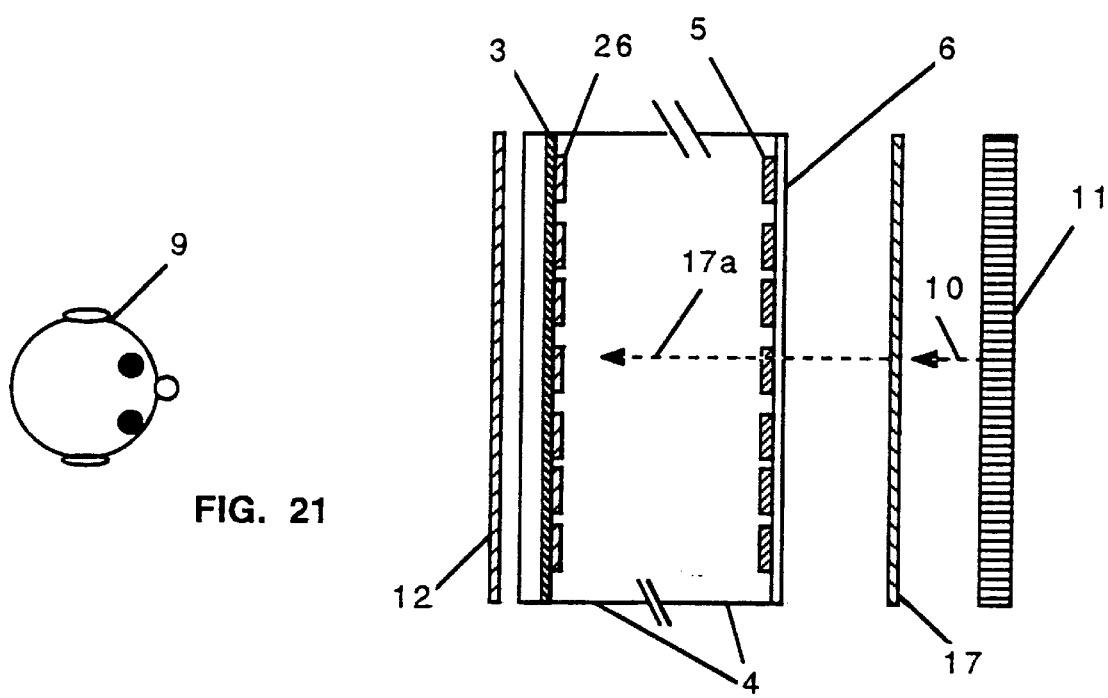
FIG. 21 illustrates a configuration that reduces the number of CLC filter layer required in certain embodiments illustrated in FIGS. 18 and 19.

If a less bright, more conventional color display with half-tone capability, comprised of the three primary colors and all combinations of two or more of the primary colors, on a black field, is desired, then the composition of the color elements 26 within the pixels can be changed, as illustrated in FIGS. 20. In these instances, a higher brightness display can be composed of pixels, the sub-pixel elements of which, display complementary colors, when disposed as illustrated in FIG. 20A or primary colors, when disposed as illustrated in FIG. 20B. The complementary color display has high brightness, less saturated spectral distributions as illustrated in FIGS. 15, 16 and 17. In the illustrations of FIGS. 20, LH CLC filter/mirror layers can be replaced by a RH circular polarizing filter 12, as illustrated in FIG. 21. This then allows the deposition of just one or two CLC filter/mirror layers within the polarization modulating cell 4 or on the outside, as illustrated in FIGS. 18 and 19. In these embodiments, the light 10 from the light source 11 is polarized by the inside polarizer 17, becoming LHCPL 17a. The light 17a transits the backplate 6 and the inside electrodes 5 and passes through the cell 4, where its polarization orientation is either changed or left unaltered. When the light 17a is unaltered it passes through the color elements 26 and is absorbed by the outside polarizer 12. When the light 17a has its handedness changed by the modulation cell 4, one or two colors of the light 17a is reflected by the color elements 26. The number of colors produced by a sub-pixel is dependent upon the number of filter/mirror layers removing light from the illumination source, as illustrated in FIGS. 20a and 20b. The remaining two or one colors of light 17a respectively, pass through the outside polarizer 12 to the viewer 9. The light reflected by the color elements 26 traverses the cell 4, passes through the electrodes 5, the backplate 6 the inside polarizer 17 and is absorbed in the light source 11.

TABLE I

|  |  | STATES | | | | | | | | | | | | |
|---|---|---|---|---|---|---|---|---|---|---|---|---|---|---|
|  |  | A | | B | | C | | D | | E | | F | | G | H |
|  | CELL | on 1 | off 2 & 3 | on 2 & 3 | off 1 | on 2 | off 1 & 3 | on 1 & 3 | off 2 | on 3 | off 1 & 2 | on 1 & 2 | off 3 | all - on | all - off |
| REFL | 1 | RED | GREEN & BLUE | GREEN & BLUE | RED | GREEN & BLUE | RED | RED | GREEN & BLUE |
|  | 2 | RED & BLUE | GREEN | GREEN | RED & BLUE | RED & BLUE | GREEN | GREEN | RED & BLUE |
|  | 3 | RED & GREEN | BLUE | RED & GREEN | BLUE | BLUE | RED & GREEN | BLUE | RED & GREEN |
|  | net color | RED | AQUA | GREEN | PURPLE | BLUE | YELLOW | WHITE | 2X WHITE |
| TRANS. | 1 | BLACK | RED | RED | BLACK | RED | BLACK | BLACK | RED |
|  | 2 | GREEN | BLACK | BLACK | GREEN | GREEN | BLACK | BLACK | GREEN |
|  | 3 | BLUE | BLACK | BLUE | BLACK | BLACK | BLUE | BLACK | BLUE |
|  | net color | AQUA | RED | PURPLE | GREEN | YELLOW | BLUE | BLACK | WHITE |

TABLE II

| | | STATES | | | | | | | | | | | | |
|---|---|---|---|---|---|---|---|---|---|---|---|---|---|---|
| | | A | | B | | C | | D | | E | | F | | G | H |
| | | on | off | on | off | on | off | on | off | on | off | on | off | | |
| | CELL | 1 | 2 & 3 | 2 & 3 | 1 | 2 | 1 & 3 | 1 & 3 | 2 | 3 | 1 & 2 | 1 & 2 | 3 | all - on | all - off |
| REFL | 1 | RED | GREEN & BLUE | GREEN & BLUE | RED | GREEN & BLUE | RED | RED | GREEN & BLUE |
| | 2 | RED & BLUE | GREEN | GREEN | RED & BLUE | RED & BLUE | GREEN | GREEN | RED & BLUE |
| | 3 | RED & GREEN | BLUE | RED & GREEN | BLUE | BLUE | RED & GREEN | BLUE | RED & GREEN |
| | net color | RED | AQUA | GREEN | PURPLE | BLUE | YELLOW | WHITE | 2X WHITE |
| TRANS. | 1 | GREEN & BLUE | BLACK | BLACK | GREEN & BLUE | BLACK | GREEN & BLUE | GREEN & BLUE | BLACK |
| | 2 | BLACK | RED & BLUE | RED & BLUE | BLACK | BLACK | RED & BLUE | RED & BLUE | BLACK |
| | 3 | BLACK | RED & GREEN | BLACK | RED & GREEN | RED & GREEN | BLACK | RED & GREEN | BLACK |
| | net color | AQUA | RED | PURPLE | GREEN | YELLOW | BLUE | 2X WHITE | BLACK |

TABLE II

| | | STATES | | | | | | | | | | | | |
|---|---|---|---|---|---|---|---|---|---|---|---|---|---|---|
| | | A | | B | | C | | D | | E | | F | | G | H |
| | | on | off | on | off | on | off | on | off | on | off | on | off | | |
| | CELL | 1 | 2 & 3 | 2 & 3 | 1 | 2 | 1 & 3 | 1 & 3 | 2 | 3 | 1 & 2 | 1 & 2 | 3 | all - on | all - off |
| TRANS. | 1 | GREEN & BLUE | RED | RED | GREEN & BLUE | RED | GREEN & BLUE | GREEN & BLUE | RED |
| | 2 | GREEN | RED & BLUE | RED & BLUE | GREEN | GREEN | RED & BLUE | RED & BLUE | GREEN |
| | 3 | BLUE | RED & GREEN | BLUE | RED & GREEN | RED & GREEN | BLUE | RED & GREEN | BLUE |
| | net color | AQUA | RED | PURPLE | GREEN | YELLOW | BLUE | 2X WHITE | WHITE |

I claim:

1. A spatial display means composed of:
   A first light polarizing filter, and
   an array of polarization modulation cells, and
   a multi-element chiral liquid crystal filter/mirror, and
   a second light polarizing filter, and
   a light source, wherein
   ambient room light being polarized by said first light polarizing filter passes into said array of polarization modulating cells, said cells having a first switched state that transmits at least one color of said light in a first polarization state and said cells having a second switched state that transforms at least said one color of light to a second polarization state, with
   light of said first or second polarization states being imposed upon said multi-element chiral liquid crystal filter/mirror, and
   said liquid crystal filter/mirror providing transmission of said light of at least one color, being of said first polarization state, with
   said transmitted light being either absorbed by said second polarizing filter or passed into said light source, and
   said liquid crystal filter/mirror providing reflection of said light of at least one color, being of said second polarization state, with
   said reflected light transiting said polarization modulation cell and said first polarizing filter to a viewer, and
   said spatial display means having the option to activate said light source, whereupon,
   light from said light source, being of at least one specific color, is polarized by said second polarizing filter, and
   transits said multi-element chiral liquid crystal filter/mirror into,
   said array of polarization modulation cells, said cells having a first switched state that transmits said light in a first polarization state and said cells having a second switched state that transforms said light to a second polarization state, with
   said light of said first or second polarization states being imposed upon said first polarizing filter, whereupon
   light of said first polarization state is absorbed by said first polarizing filter and light of said second polarization state is transmitted to a viewer.

2. A spatial display means according to claim 1, wherein said first and second polarizing filters are circularly polarizing filters, and
   said array of polarization modulation cells are specifically an array of variable retardation cells, with said cells switching between said first switched state of having substantially no retardation and intermediate states of retardation, up to and including said second switched state of having substantially a half wave of retardation, and said intermediate states of retardation producing intermediate intensities or color variations of the light presented to said viewer.

3. A spatial display means according to claim 1, wherein said multi-element chiral liquid crystal filter/mirror and said second light polarizing filter are functionally combined, said combined element being comprised of at least two chiral liquid crystal species.

4. A spatial display means according to claim 3, wherein said combined element is disposed in an array, the specific elements of said array being incorporated within the cells of said array of polarization modulation cells.

5. A spatial display means according to claim 1, wherein said multi-element chiral liquid crystal filter/mirror is disposed in an array, the specific elements of said array being incorporated within the cells of said array of polarization modulation cells.

6. A spatial display means according to claim 5, wherein said combined element is disposed in at least two sets of combined elements, within the array of polarization modulation cells, said sets forming sets of modulation cells, with
the individual sets of said combined elements, reflecting and transmitting light of substantially uniform color within each set, but of a color distinct from that respectively reflected and transmitted by other of said sets, and
having said sets of cells so disposed as to form color picture elements containing one cell of each of said sets.

7. A spatial display means according to claim 1, wherein said light source has a spectral distribution excluded by the accumulated reflective spectral response of said multi-element chiral liquid crystal filter/mirror.

8. A spatial display means according to claim 1, wherein said array of polarization modulating cells is disposed between said first light polarizing filter and said light source, and said multi-element liquid crystal filter/mirror is disposed between said array of polarization modulating cells and said light source, and said second polarizing filter is disposed between said multi-element liquid crystal filter/mirror and said light source.

9. A spatial display means composed of:
A first light polarizing filter, and
an array of polarization modulation cells, and
a quarter wave retardation element, and
a multi-element chiral liquid crystal filter/mirror, and
a second light polarizing filter, and
a light source, wherein
ambient room light being polarized by said first light polarizing filter passes into said array of polarization modulating cells, said cells having a first switched state that transmits said light in a first polarization orientation and said cells having a second switched state that transforms said light to a second polarization orientation, with
light of said first and second polarization orientations impinging upon said quarter wave retardation element, said quarter wave element transforming said light into polarized light having a substantial circular polarization component, and whereupon light of said transformed first or second polarization orientations comprised light of a first and second polarization states, with said light being imposed upon said multi-element chiral liquid crystal filter/mirror, and said liquid crystal filter/mirror providing transmission of said light of at least one color, being of said first polarization state, with said transmitted light being either absorbed by said second polarizing filter or passed into said light source, and said liquid crystal filter/mirror providing reflection of said light of at least one color, being of said second polarization state, with said reflected light of said second polarization state, transiting said quarter wave element, whereupon said reflected light is transformed to its original polarization orientation, and passed through said polarization modulation cell to said first polarizing filter to a viewer, with said spatial display means having the option to activate said light source, whereupon,
light from said light source, being of at least one specific color, is polarized by said second polarizing filter, and passes through said multi-element chiral liquid crystal filter/mirror to said quarter wave element, whereupon
the light is transformed to linearly polarized light, and the orientation of said transformed linearly polarized light being controlled by said switched states of said polarization modulation cells, with the orientation of said first switched state of said polarization modulation cells providing an orientation of said linearly polarized light that is substantially absorbed by said first polarizing filter, upon which said light impinges, and the orientation of said second switched state of said polarization modulation cells providing an orientation of said linearly polarized light that is substantially transmitted by said first polarizing filter, upon which said light impinges, and said transmitted light passing to a viewer.

10. A spatial display means according to claim 9, wherein said first and second polarizing filters are linearly polarizing filters, and said array of polarization modulation cells are specifically an array of twisted nematic liquid crystal cells, with
said cells switching between said first switched state of having substantially no rotation of the plane of polarization of the light transiting said cell and intermediate states, wherein said plane of linear polarization is rotated up to and including said second switched state, providing substantially 90° of rotation of said plane of linear polarization, and wherein
said intermediate states produce intermediate degrees of rotation providing intermediate intensities or color variations of the light presented to the viewer.

11. A spatial display means according to claim 9, wherein said multi-element chiral liquid crystal filter/mirror and said second light polarizing filter are functionally combined, said combined element being comprised of at least two chiral liquid crystal species.

12. A spatial display means according to claim 11, wherein said multi-element chiral liquid crystal filter/mirror or said combined element is disposed in an array comprised of at least two sets of combined elements, with the individual elements of each set being associated with individual polarization modulation cells, the individual sets of said combined elements, reflecting and transmitting light of substantially uniform color within each set, but of a color distinct from that respectively reflected and transmitted by other of said sets, and having said sets of cells so disposed as to form color picture elements containing one cell of each of said sets.

13. A spatial display means according to claim 9, wherein said light source has a spectral distribution excluded by the accumulated reflective spectral response of said multi-element chiral liquid crystal filter/mirror.

14. A spatial display means according to claim 9, wherein said array of polarization modulating cells is disposed between said first light polarizing filter and said light source, and said multi-element liquid crystal filter/mirror is disposed between said array of polarization modulating cells and said light source, and said second polarizing filter is disposed between said multi-element liquid crystal filter/mirror and said light source, and said quarter wave retardation element is disposed between said array of polarization modulation cells and said multi-element liquid crystal filter/mirror.

15. A spatial display means composed of:

a first light polarizing filter, and an array of polarization modulation cells, and an array of multi-element chiral liquid crystal filter/mirror elements, disposed in at least two sets of color encoding elements, each set reflecting and transmitting light of substantially uniform color in at least one of two switched states of said polarization modulating cells and each element of each set being associated with individual cells of said array of polarization modulation cells, said sets of cells so disposed as to form color picture elements containing one cell of each of said sets, and a second light polarizing filter, and a light source, wherein light from said light source is polarized to a first state by said second light polarizing filter, with said light passing into said array of polarization modulation cells, said cells having a first switched state that transmits said light in a first polarization state and said cells having a second switched state that transforms said light to a second polarization state, with said light of a said first and second polarization states being imposed upon said array of multi-element chiral liquid crystal filter/mirror elements, and said light of said first polarization state in a first embodiment being reflected by said liquid crystal filter/mirror elements, returning said light to the light source where it is absorbed or in a second embodiment, having said light of said first polarization state being transmitted by said liquid crystal filter/mirror elements to said first light polarizing filter, where it is absorbed, and having in said first and second embodiments, at least one color of said light of said second polarization state being reflected by said liquid crystal filter/mirror elements and returned to said light source, with the remainder of said light passing to a viewer, with said light passing through said first light polarizing filter to a viewer in said second embodiment.

16. A spatial display means according to claim 15, wherein said array of multi-element chiral liquid crystal filter/mirror elements is disposed between said optional first light polarizing filter and said light source, and said array of polarization modulation cells being disposed between said array of multi-element chiral liquid crystal filter/mirror elements and said light source, with said second light polarizing filter being disposed between said array of polarization modulation cells and said light source.

17. A spatial display means according to claim 15, wherein said optional first and second light polarizing filters are circularly polarizing filters, and said array of polarization modulation cells are specifically an array of variable retardation cells, with said first switched state producing substantially no retardation and said second switched states constituting a half wave of retardation, and having intermediate switched states that produce intermediate degrees of retardation, and said intermediate degrees of retardation producing intermediate intensities or color variations of the light presented to said viewer.

18. A spatial display means according to claim 15, wherein said array of multi-element liquid crystal filter/mirror elements are in at least two sets of color elements, within the array of polarization modulation cells, said sets of color elements forming sets of modulation cells, with the individual sets of said color elements transmitting light of substantially uniform color and polarization within each set for a given switched state of said modulation cells, said color being distinct from the color of the light transmitted by color elements of other said sets, and having said sets of cells so disposed as to form color picture elements containing one cell of each of said color element sets.

19. A spatial display means according to claim 15, wherein said light passing to a viewer is first projected upon a display screen, wherein said light reflected or transmitted to said viewer.

20. A spatial display means according to claim 15, wherein said viewer directly views said spatial display.

21. A spatial display means according to claim 15, wherein said array of multi-element chiral liquid crystal filter/mirror elements and said first light polarizing filter are functionally combined, said combined element being comprised of at least two chiral liquid crystal species.

* * * * *